United States Patent [19]

Bloch et al.

[11] Patent Number: 4,688,105

[45] Date of Patent: Aug. 18, 1987

[54] VIDEO RECORDING SYSTEM

[76] Inventors: Arthur R. Bloch, 5966 Zinn Dr., Oakland, Calif. 94611; Kenneth A. Bloch, 18441 Los Alimas St., Northridge, Calif. 91326

[21] Appl. No.: 732,869

[22] Filed: May 10, 1985

[51] Int. Cl.⁴ .............................................. H04N 5/76
[52] U.S. Cl. .................................... 358/335; 358/342; 360/55; 360/137; 369/12
[58] Field of Search ................ 354/290, 291; 358/310, 358/335, 342; 360/55, 137; 369/12

[56] References Cited

U.S. PATENT DOCUMENTS 3,864,708 2/1975 Allen ................................ 354/291 X Primary Examiner—Robert L. Richardson
Attorney, Agent, or Firm—Thomas M. Freiburger

[57] ABSTRACT

A video recording system enables self-service production of vended videocassette recordings to a user or customer, with user control of several features. Preferably the system includes forming a composite video picture with the user's image in combination with a user-selected background sequence. Compositing may be by chromakeying, with a key color as a backdrop behind the user in a recording booth. As the composite video recording is made the user preferably is able to watch the composite image on a monitor, which may also include prompting messages for the user. A preferred control for the system involves control data encoded on a videodisc, which also holds a plurality of selectable background sequences.

62 Claims, 15 Drawing Figures

VIDEO RECORDING SYSTEM

BACKGROUND OF THE INVENTION

The invention relates to video recording apparatus and methods, and more particularly to a system for enabling a person to make a video recording of himself, with the recording dispensed to the person. In a specific embodiment of the invention the person can make a recording with his/her own image combined with that from a selected background sequence.

Self-service apparatus for recording a customer's image has previously been known, in the form of photography booths for making series of passport-size photos vended to the customer. See, for example, U.S. Pats. Nos. 1,946,323, 2,796,812, 3,631,781, and 3,864,708. The latter patent, to Allen, discloses a booth with coin-operated camera apparatus, and includes a background scene. The background scene is limited, being fixed and simply photographed in the same still picture with the subject. Allen's system was designed to automatically develop and print the photograph on a postcard. The system also includes focal length variability of the camera lens, but only in connection with the fixed, still background image and with the relative size of the user's image and background image remaining generally constant.

With respect to video apparatus, the prior art includes video "jukeboxes" which will play on a screen a video selection with music upon insertion of coins or tokens by a customer. In another video application, shopping for consumer products can be accomplished in video "kiosks," wherein a shopper orders one or several of many products shown him/her on a video screen for later delivery.

Such video apparatus of the prior art has not included any means for a user or customer to make a video recording.

The prior art did not contemplate a video system having selfservice, vending, and background adding features, as encompassed by the present invention described below.

SUMMARY OF THE INVENTION

The present invention comprises an automatic audio/video recording and dispensing system. In one form, the invention may include a booth with two compartments, a front compartment for the user and a rear compartment which houses a camera and recording equipment. The recording equipment may, however, be remote from the camera. The user (or users), upon inserting money, token, credit card or upon starting the operation in some other way, proceeds to talk, sing or otherwise perform in front of the camera for a preset limited time period, at the end of which time the user is dispensed a videocassette or other recorded medium containing his/her image and sound.

In a more elaborate form of the invention, described herein, the user is afforded a great many options, chief among them being the selection of one of several or many audio/video background sequences, prerecorded on a laser videodisc or other video playback medium, over which the user's image is electronically "matted" or "keyed," or otherwise combined with the background image, at the appropriate time or times. This combined image is then recorded onto videotape or another appropriate vendable and consumer-usable medium. The user's voice is mixed with the sound from the background sequence, and his/her name and other information can appear in a title sequence or elsewhere in the recording. The size of the user's image on the screen may vary from scene to scene in a given recording session, as means are disclosed for controlling the focal length of the camera lens at the discretion of the user or under pre-programmed control, which may be responsive to events and scenes in the prerecorded background sequence. Similarly, the image of the user may appear in certain scenes and not appear in others, as means preferably are included for controlling a video switching matrix within the unit, and thus effectively controlling the chromakeyer or other video compositing device by signals from a microcomputer.

Another feature of the invention is a system whereby the control of video recorders, cassette changers, object lights, video chromakeyer or other compositing device, zoom lens and other essential functions of the system is achieved through use of control data encoded on the videodisc, which may include precisely timed data bursts on the audio track, which are detected and sent as information in binary from to the microcomputer unit. This setup makes possible the use of a wide variety of prerecorded background sequences of practically any length and complexity, because timing control of the entire system is contingent on control signals encoded specifically for each background sequence.

An optional component of the microcomputer unit is a character generator ROM, which makes it possible to use a television monitor inside the booth as a cuing and prompting device, with imput data coming either from the microcomputer, from a keyboard, or from the encoded signal on the videodisc. This last data source makes possible the precisely timed insertion of subtitles, lyrics, monologue, dialogue and other text which is specific to a particular prerecorded background sequence. Such text can be visible to the user of the booth without the text being recorded onto the videotape.

This invention provides a flexible, multipurpose apparatus which has a great many applications and advantages, from entertainment to training and education. In its simplest form it provides an automatic, private, self-service system for obtaining a videotape of an individual or of a small group for any purpose. With the added chromakey function it becomes possible for a user to "interact" with a prerecorded video sequence of any sort while the interaction is itself being recorded. The user can sing along with a musical group while his/her image is inserted into that of the group; he/she can appear in any location or series of locations, the resulting video recording thus providing an ideal travel souvenir or video "letter"; existing movies or videotapes can be re-edited with the user's voice and/or image inserted; the user can engage in dialogue with anyone whose image and/or sound is prerecorded, or in a monologue before a prerecorded audience or in any setting; he/she can interact with abstract, animated or graphic images, either prerecorded on the videodisc or generated by the encoded videodisc in real time; the user can appear in action or fantasy sequences, or engage in video games, etc. This list of possible applications is by no means complete, and is provided only to indicate the scope and flexibility of the invention.

DESCRIPTION OF PREFERRED EMBODIMENTS

Figure 1:
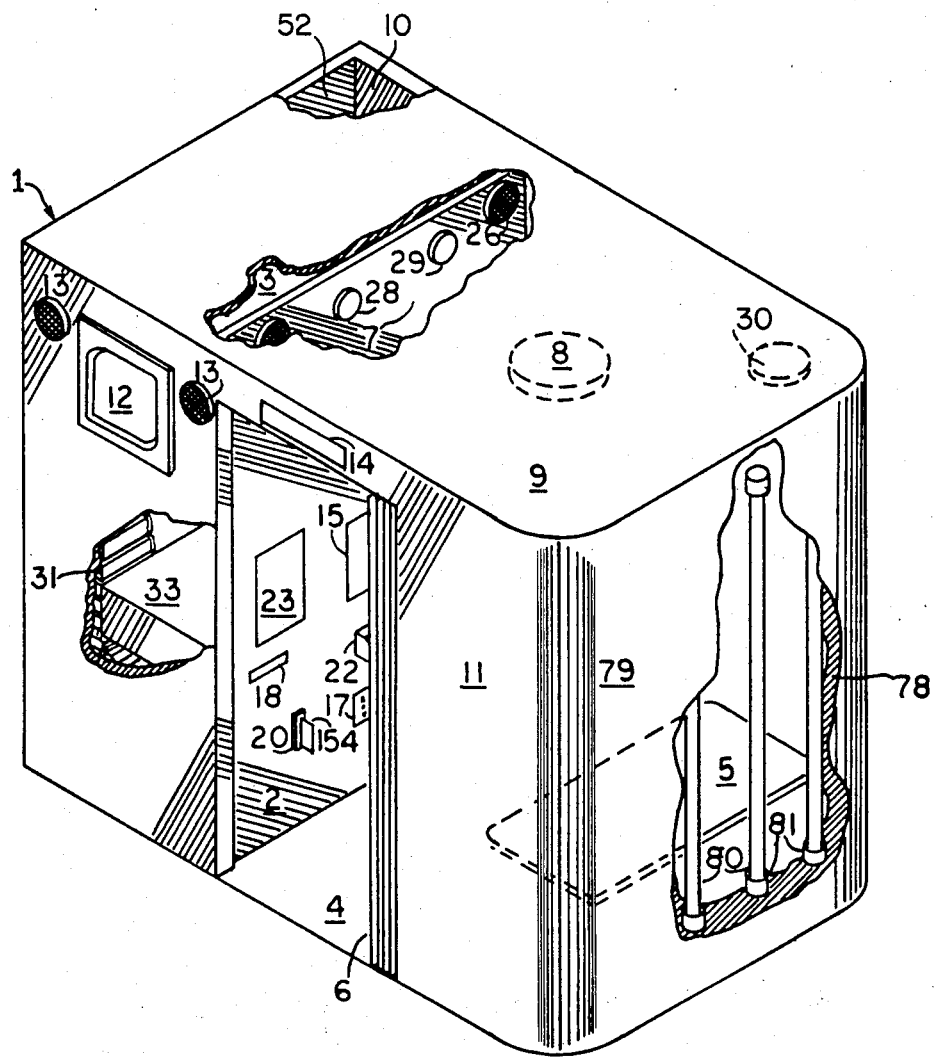
FIG. 1 is an overall perspective of the audio/video recording booth with portions cutaway to reveal certain features.

FIG. 1 shows a video recording booth 1 which preferably is included in the system of the invention, affording privacy and some degree of sound isolation. It is sufficient that some form of recording area or enclosure, preferably with some degree of isolation, is provided, but the use of a booth or enclosure such as shown and described herein is preferred. cutaways and detail of a main panel 2 and a rear compartment 3 will reveal that this preferred embodiment is configured for the recording and dispensing of video in the form of ½" videotape cassettes in VHS and Beta formats, but the invention is intended to be adaptable to other videotape formats and other recording media.

Figure 6:
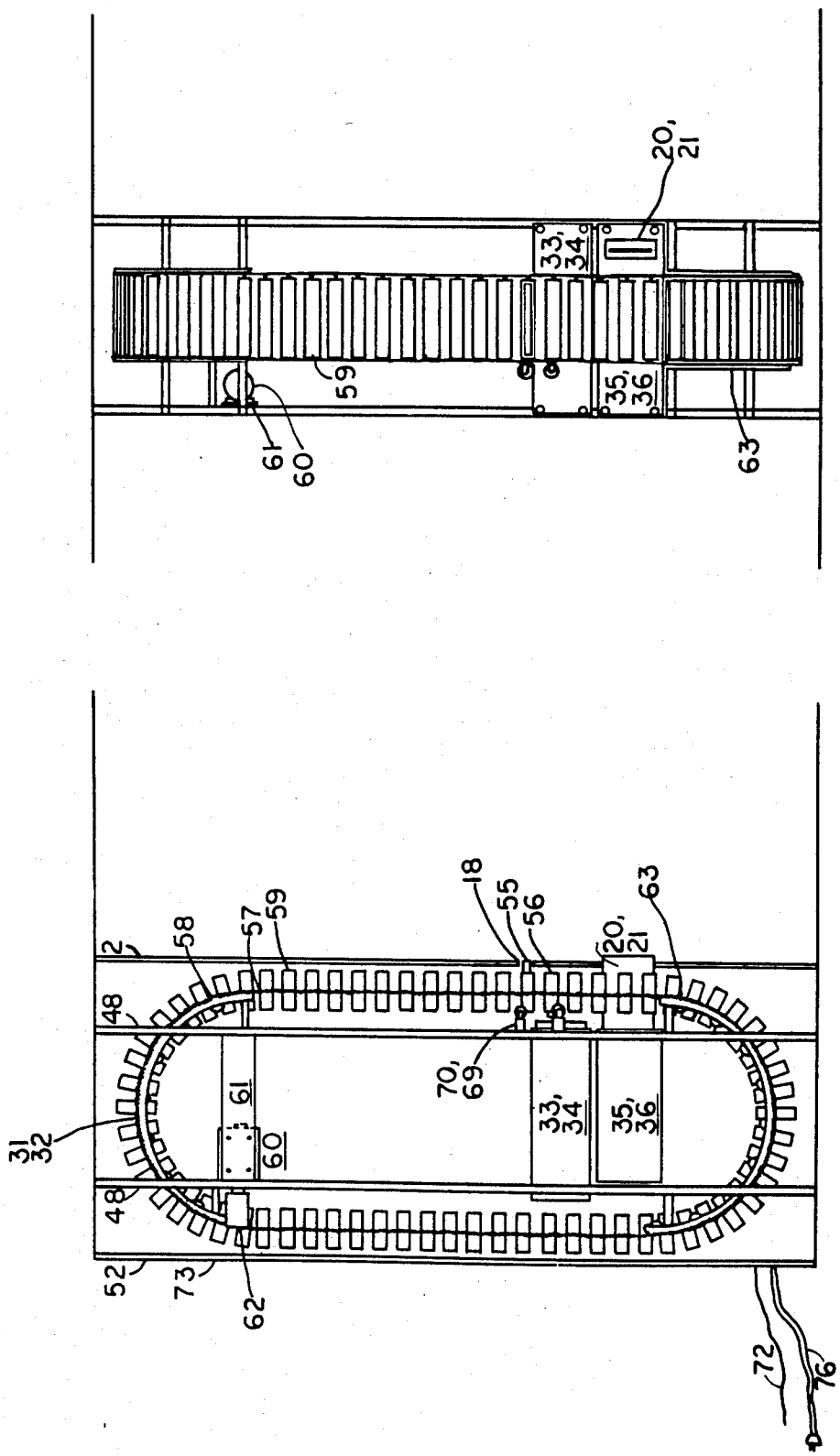
FIG. 6 is detail of the videocassette changer assembly from two views.

The booth 1 comprises a side wall 11 with door opening, an opposite side wall 10, an accordion, hinged or other type of door 6, a ceiling 9, a front wall 79, a floor 4 and a rear wall 52 with a service access door 73, shown in FIG. 6. Walls, ceiling and door are made of sound proofing material to minimize the recording of noise from outside the booth and to maximize user privacy.

Features depicted on the outside of the booth are an "on air"light 14 to indicate to people outside the booth that the sytem is in use; stereo preview monitor speakers 13 and a preview monitor 12, which can be used to show the selection of possible video and audio background sequences that are available, samples of ways in which the system is utilized, text or graphic messages to prospective users or any other prerecorded or live video signal.

The inside of the booth 1 is divided into two compartments by a main panel 2. The front or user compartment 7 contains a bench 5 which is adjustable in height and which can fold down if necessary. Mounted in the ceiling 9 is a room light 8 which is illuminated when the system is in a standby mode. Also mounted in the ceiling 9 is a toplight 30, which along with a key light 28 and a fill light 29, mounted in the main panel 2, serve to illuminate the user in the front compartment 7 during the operation of the system. The function of the toplight, which is located slightly behind and above the user, is to effectively improve the separation between the user and the backdrop and to eliminate shadows on the backdrop. Details on the main panel 2 visible in the front compartment 7 are described below in the explanation of FIG. 3.

Visible in the cutaway of the rear compartment 3 in FIG. 1 are portions of a videocassette changer 31 and of a videocassette player/recorder (VCR) 33.

Figure 2:
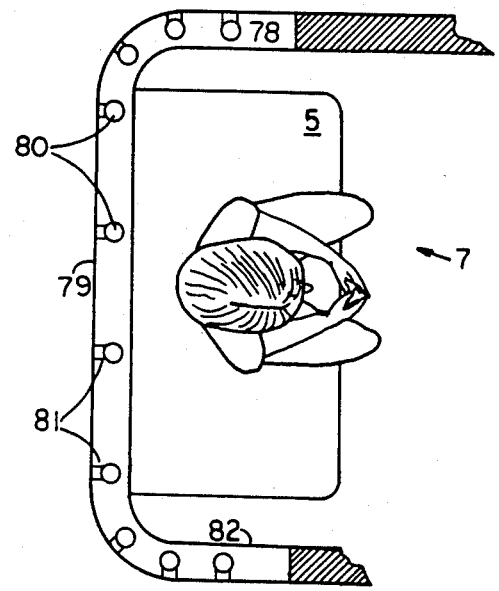
FIG. 2 is a top view detail of the front wall assembly.

Visible in the cutaway of the front wall 79 in FIG. 1 are features of the front wall assembly 78 detailed in top view in FIG. 2. Several flourescent lamps 80 mounted at connections 81 to the inside of the front wall 79 serve to illuminate a diffuser panel 82 of colored transluscent material which provides a constant and controlled colored backdrop for improved chromakey effects as further described below. The front panel assembly 78 is curved around the sides of the front compartment 7 to allow use of the widest possible focal length of a zoom lens 50, which in turn allows for the greatest possible variation in the size of the user image in the keyed video 88.

As further explained below, the chromakey effect is acheived by adjusting a video chromakeyer 41 to replace a given color in a video image, wherever such color occurs, with an image received from another video source. In the case of this preferred embodiment the primary video source or input 87 to the chromakeyer 41 comes from a camera 49 located in the rear compartment 3 (see FIG. 5 and the diagram of FIG. 8.) The secondary input 142 (FIG. 8) which provides the background image comes from a videodisc player (VDP) 42 via a video switching matrix 89. As the backdrop 82 color and lighting remain constant in the present system it is not necessary to readjust the color sensitivity of the chromakeyer 41 whenever the system is turned on.

The colored backdrop necessary for achieving the chromakey effect can also be provided by simply using a front-lit colored wall behind the user, but the preferred system of rear lighting shown in FIG. 2 has the advantage that a lower light level is necessary in the front compartment 7, creating less difficulty with shadows on the colored background, which would compromise the effect.

It should be noted that the use of a chromakey system in the invention is a function of this preferred embodiment. Chromakey provides a realistic method of placing a user's image into an image from a background source as if the user were "in the picture," i.e. at the background location. Other compositing systems can be incorporated into the invention without compromising the principles involved. For instance a video switcher or analog special effects generator with "wipe patterns"can be used to split the screen between the user's image and the background image in many different ways. More complicated or sophisticated systems, such as digital video effects, can also be used to create different sorts of composite picture. None of these other effects, however, would create the impression that the user were located "within" the scene of the background.

Figure 3:
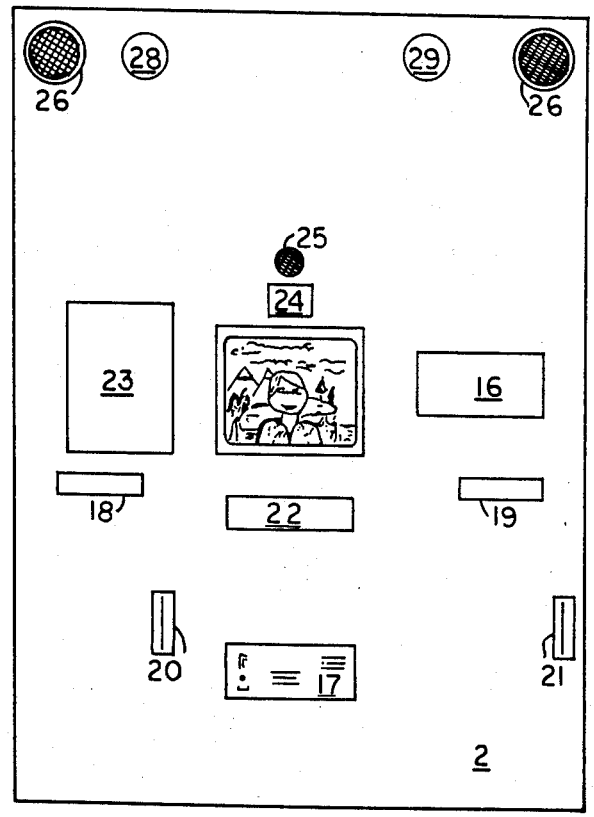
FIG. 3 is a view of the main panel in the booth as seen from the front compartment.

FIG. 3 shows the main panel 2, made out of opaque material, which the user faces when sitting or standing in the front compartment 7. Located on the panel are instructions 23 for operation; a control panel 16 with controls as detailed in FIG. 10; VHS and Beta format videocassette vending dispenser slots 18, 19 from which the user will withdraw a completed videocassette; videocassette sleeve dispenser slots 20,21 from which the user will withdraw a folded sleeve 154 of the appropriate size to protect the completed videocassette, made of cardboard or other material; a payment unit 17 for accepting coins, tokens, currency and/or magnetically striped credit card from the user. This unit is optional depending upon the usage to which the invention is being put.

Also on the main panel 2 is a monitor window 15 (see FIG. 5 in particular) through which the user will veiw an image of the booth video monitor 37 which is concealed behind the main panel 2 and reflected in a half-mirror 38. The booth monitor 37 can be used for instructions and prompting before, during and after a recording session, and for displaying previews of the background sequences available on the videodisc. The booth monitor 37 can also be used to review a completed videotape if the system is so configured. An alternative is to use a separate "review VCR"(not shown) in conjunction with its own "review monitor" (not shown), which together are better located outside the booth 1 so that the user's review time does not monopolize the booth.

During a recording session the image being recorded, mainly the background image generated by the VDP 42 with the user's own image superimposed, will be visible to the user through the monitor window 15. Also appearing in this window 15, i.e. in the booth monitor 37, will be any text which is encoded on the videodisc and sent to the character generator 47, such as prompting and cues, but which may or may not be recorded onto the videotape 55 or other recording medium. As explained below (FIG. 10), the specific control instruction as to whether such text is to be recorded or simply shown to the user on the booth monitor 37 is also encoded onto the videodisc and is specific to each prerecorded background sequence. Also encoded onto the videodisc are other such control instructions 140, which govern the content of the finished program by determining the timing and appearance of the keyed image from the camera 49, the audio mix, the focal length of the zoom lens 50 and other functions as described below.

Also shown in FIG. 3 is an optional keyboard 22 on which the user can enter name, date or other data as required which will appear on the video recording in the title sequence, credits or elsewhere. Data entered on the keyboard 22 will be echoed on the booth monitor 37 as it is entered. The keyboard 22 can also be used as a data or control entry source for interaction with the VDP 42 and/or with the microprocessor unit (MCU) 45 for whatever purpose the invention is used.

Other features on the main panel 2 are a microphone grill 25 made of audio-transparent material, concealing a microphone 39 for picking up sound from the front compartment 7; and a cue light window 24 through which cue lights 40 can be seen. The cue lights will notify the user when recording of the camera image has begun, of time remaining, and when recording of camera image has finished. Right and left booth speakers 26 are included for reproducing the background audio output 95,97 of the VDP 42 for the user during recording; and the key light 28 and fill light 29 illuminate the user during a recording session.

Figure 4:
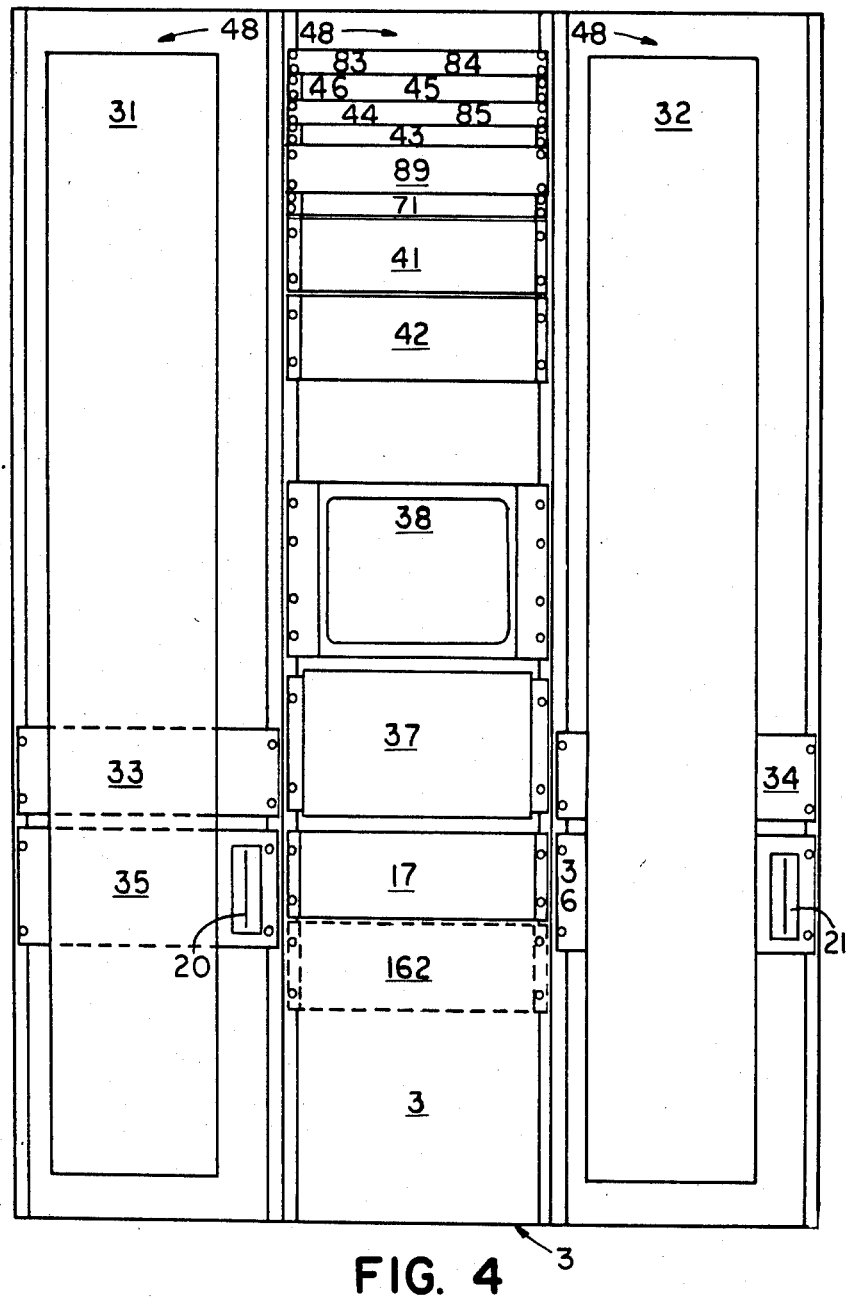
FIG. 4 is a view of the rear compartment of the booth as seen from the front compartment with the main panel removed
Figure 8:
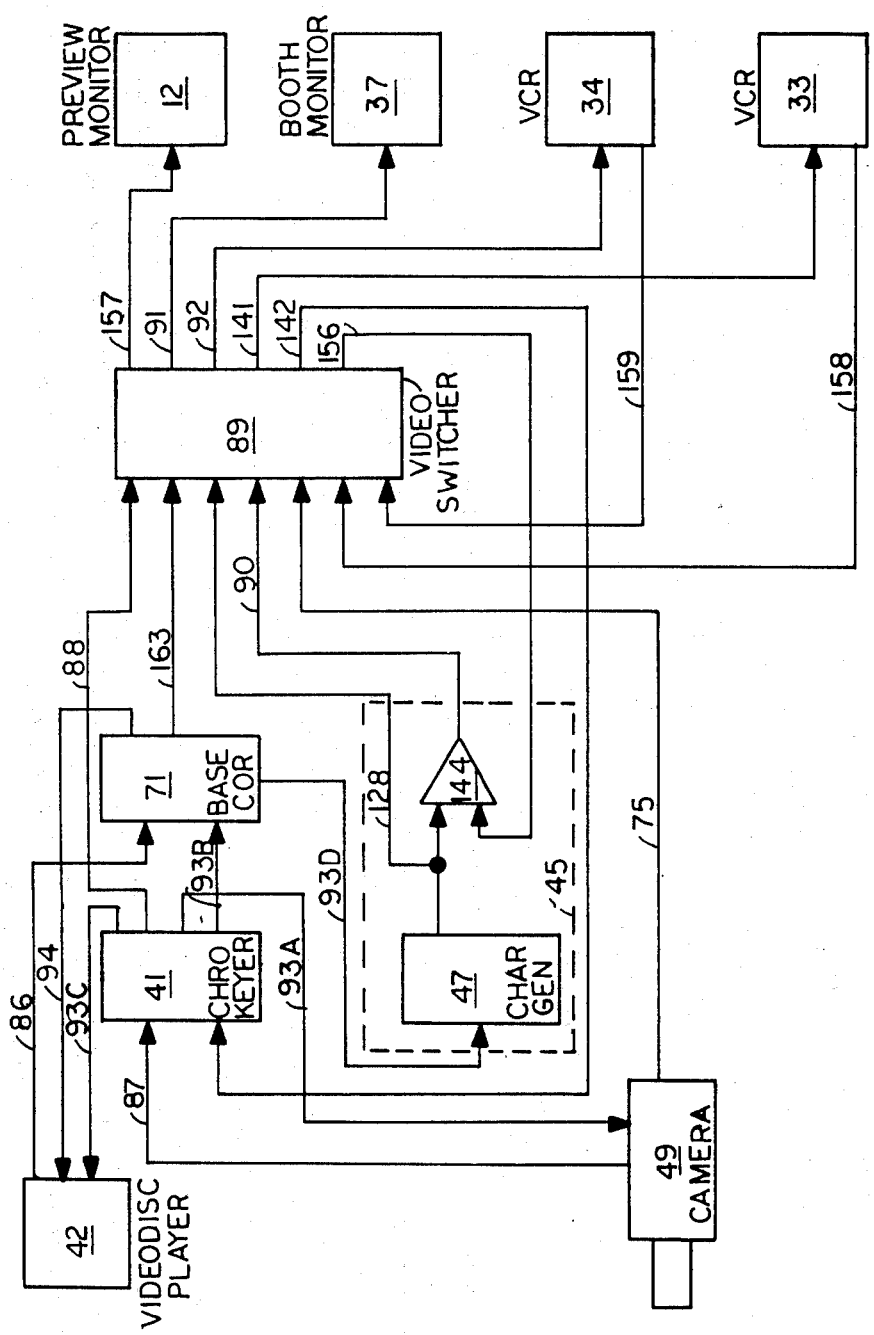
FIG. 8 is a block diagram showing the video flow in the invention.

If the main panel 2 were to be removed it would reveal a view of the rear compartment 3 such as shown in FIG. 4. Visible in this illustration, sometimes in block diagram form, are standard 19" relay racks 48 comprised of vertical rails to which equipment is attached using rack mount ears or brackets; two videocassette changers 31,32 detailed in FIG. 6; two VCR'S 33,34; two sleeve dispensers 35,36; the coin/currency/token/credit card payment unit 17; the booth monitor 37; the reflecting side of the angled "one-way" or half-mirror 38; in the half-mirror a sample image from the VDP 42 without the user's keyed image superimposed; the video chromakeyer 41, the function of which is to electronically the camera image over the image generated by the VDP 42; the videodisc player (VDP) 42; an optional second VDP 162; an audio amplifier 43 with built in pre-amplifier to amplify two channels of audio from the VDP 42 for speakers 13,26 (See FIG. 9 for audio flow); a notch filter 85 to remove the pulse modulated carrier control signal 140 from the audio output 96 of the VDP 42; audio mixer 44 with automatic level control on the microphone input to mix the microphone signal 102 and VDP audio signals 95,96 at proper levels; a control signal demodulator 46 detailed in FIG. 11; a microcomputer 45 detailed in FIG. 13; a changer control unit 83 and a light control unit 84, the functions of which are described in the discussion of FIG. 10; a video switching matrix 89 for the routing of video signals and a time base corrector 71 for stabilizing the video signal (FIG. 8).

Figure 5:
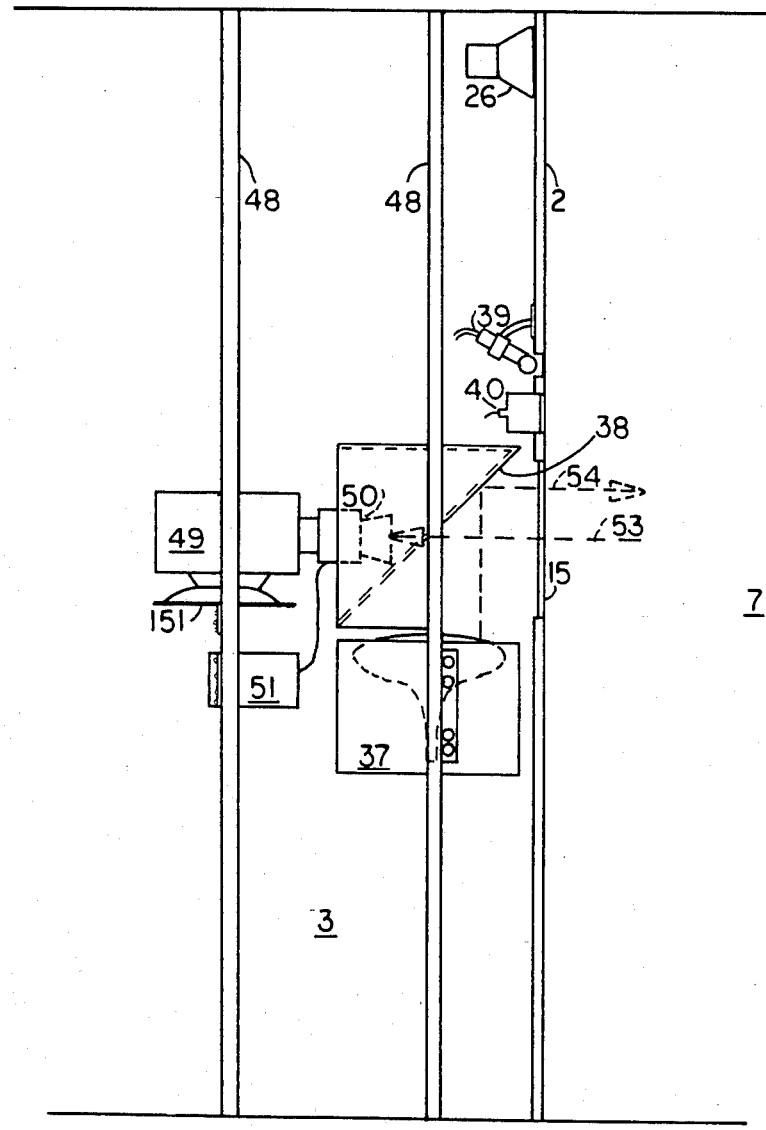
FIG. 5 is a side view detail of the camera/mirror/booth monitor configuration.

FIG. 5 shows a side view of the configuration of the video camera 49 system in the rear compartment 3. The image from the front compartment 7 is received through the monitor window 15 (see arrow 53) in the main panel 2 and through the "one-way" or half-mirror 38. The term half-mirror is understood herein and in the claims to indicate any appropriate material which is more or less transparent from one side and more or less reflective from the other. The booth monitor 37 is reflected (see arrow 54) in the mirror 38, enabling the user in the front compartment 7 to look directly at the camera lens 50 while seeing through the monitor window 15 the complete keyed image being recorded. The camera is mounted on an adjustable mount 151 which is fixed to the rack 48. Also shown in FIG. 5 are the microphone 39, the cue lights 40, and a booth speaker 26, all mounted to the backside of the main panel 2.

The servo zoom camera lens 50 is connected with a servo control unit or shot box 51, which controls the focal length of the lens with voltage levels triggered by the microcomputer 45 as per instructions (line 136) from the control panel 12 or from the encoded videodisc associated with the VDP 42. (See FIG. 10.) It should be noted that regardless of the focal length of the lens, the full background image from the VDP 42 is sent to the video recorder, except insofar as at the longer focal lengths the user's image will replace more of the background image that at the shorter focal lengths. This is a different effect, reflecting a different principle, than would be achieved if a background scene were simply painted, printed or rear-projected behind the user and then photographed by the video camera 49.

FIG. 6 shows a form of videocassette changer assembly 31,32 in accordance with a preferred embodiment of the invention. Each cassette changer is comprised of a number of cassette carriers 59, a drive chain 57 acting as an endless conveyor, chain guides 63 mounted on the rack rails 48, and sprockets 58. Movement is achieved by use of an electric motor 60 and a gearbox assembly 62 connected to one or more of the sprockets 58. The sprockets are mounted in the chain guides 63 and provide low friction passage of the chain 57 over the chain guides. The motor 60 is attached to a motor mounting plate 61 which in turn is attached to the rack rails 48.

Cassette reloading by an equipment operator is accomplished through a service door 73 in the rear wall 52 of the booth. The completed cassette is dispensed at 55 through the dispenser slot 18 or 19 in the main panel 2. Also shown in FIG. 6 are the cassette sleeve dispenser 35,36 and the sleeve dispenser slots 20,21.

Electricity for the system is provided through a power cord 76 which mates with a duplex outlet. A telephone line 72 is necessary if a magnetic stripe credit card reader/decoder 17 is used, as indicated in FIG. 3.

Figure 7:
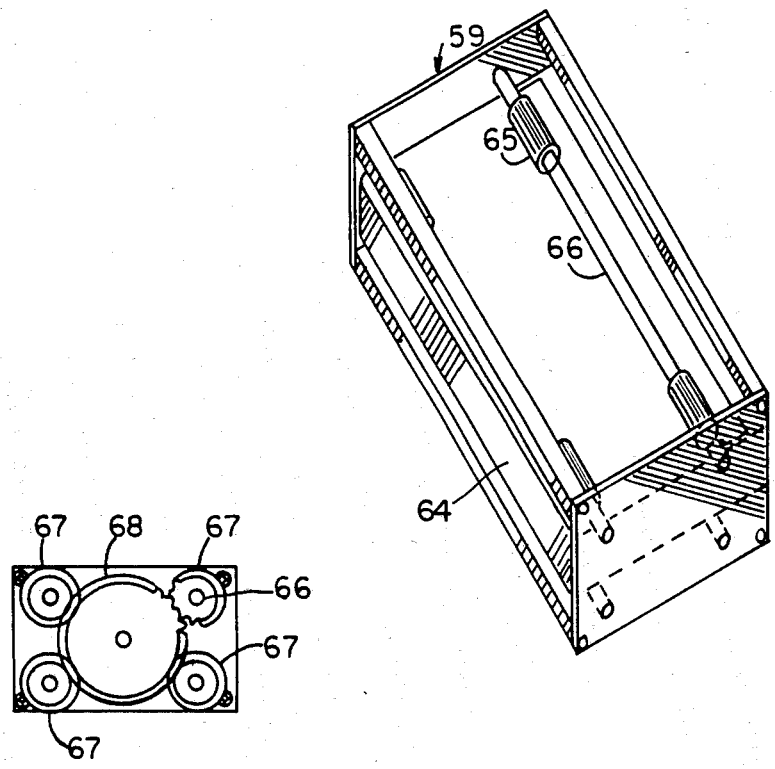
FIG. 7 is a detail of the videocassette carrier assembly, a component of the videocassette changer, from two views.

The videocassette carrier assembly 59, detailed in FIG. 7, is responsible for inserting a cassette (at 56) into the VCR 33,34, removing it (at 56) and dispensing it (at 55). Bi-directional movement of the cassette 64 is accomplished through contact with pinch rollers 65 on shafts 66 which are attached to gears 67 that engage an idler gear 68. When the changer 31,32 rotates the carrier 59 into position, one shaft gear 67 is engaged by a drive gear 70 attached to a small electric motor 69, which provdes motive power to move the tape. Motors 69 are positioned at inserting and dispensing positions. (FIG. 6.)

An alternative method of handling videocassetes would be to allow the user to manually insert his/her own videocassette into an access slot which leads directly into the VCR 33,34. This has the effect of eliminating the need for the cassette changers 31,32 and the sleeve dispensers 35,36. The disadvantage is that this greatly increases the possibility of damage to a VCR by a careless user. Another alternative method is to have an equipment operator handle the insertion, removal and/or vending of the videocassette.

The two primary video sources in the invention, as shown in the video flow diagram FIG. 8, are the videodisc player (VDP) 42 and the video camera 49. The video output (line 86) of the VDP is routed through a time base corrector (TBC) 71 to stabilize the image and then is sent (line 163) to the video switching matrix 89. This unit allows any input to be sent to any, all or none of several outputs. In the standard operation of the system as described in this preferred embodiment, the output from the VDP is routed through the switching matrix and via line 142 to the video chromakeyer 41, where it is combined with the output (line 87) of the camera 49. The camera output (line 87) is an RGB signal actually consisting of three lines. a single-line video signal 75 from the camera 49 may be sent directly to the video signal switcher 89 to allow for other uses of the invention not involving the chromakeyer.

The keyed video output 88 from the chromakeyer 41 is then sent back to the switcher 89, from where it is possible to route it (91,92,141) to whichever VCR 33,34 is selected and to the booth monitor 37.

In order for text from the character generator 47 to be keyed over the video image, an output 156 from the switcher 89 is sent to a summing amplifier 144 where it is combined with the output 128 from the character generator 47 and routed (line 90) back to the switcher 89. It should be noted that both the character generator function and the summing amplifier 144 are in fact parts of the microcomputer unit (MCU) 45, detailed in FIG. 14. The character generator output 128 is also sent directly to the switcher 89 so that text alone can be sent out, primarily to the booth monitor 37 when, for instance, the user is entering data on the keyboard 22 or when prompts or instructions are being sent from the videodisc or from the MCU 45.

The outputs 158,159 from the VCRs 33,34 are also sent to the switcher 89 for playback of the completed tape and to add flexibility to the system. Another output 157 of the switcher 89 is sent to the preview monitor 12. A prerecorded sequence on the videodisc designed for use on the preview monitor can be sent there (line 157) whenever the system is not in use. A second VDP 162 (FIG. 15) would allow a constant preview sequence to be shown on the preview monitor 12, generated by whichever VDP 42,162 is not being used to provide the background sequence for the booth recording.

The remaining connections in FIG. 8 shown the routing of the "sync" signal. Chromakeyer black burst outputs 93A,93B,93C are sent to the sync inputs of the camera 49, the TBC 71 and the VDP 42 respectively. The sync signal 93B sent to the TBC 71 is looped through (line 93D) to provide sync for the character generator 47. Additionally, the sub-carrier output 164 of the TBC 71 is sent to the VDP 42. For greater flexibility it is also possible to provide external sync to the VCRs 33,34.

It should be noted that the TBC 71 is an option which improves the video signal but which is not essential to the invention. In the event a TBC is not used, the VDP 42 becomes the primary sync source and the chromakeyer 41, camera 49 and character generator 47 are locked to it. The video output 86 of the VDP 42 is then routed directly to the switcher 89.

It should also be noted that it is possible to use other optional video processing equipment with the system without affecting the basic operation or principals of the system. For instance an alternative or an addition to the chromakeyer would be the use of a digital video effects generator (DVE), which can place the user's image into a box inserted over the background image or can place the background image into a box beside the user's image. Many other video effects are also possible with a DVE or with other digital or analog video processing equipment. Similarly, other compositing systems that are more (or less) sophisticated than chromakey, ranging from simple switching or special effects systems incorporating half-wipes to matting systems such as Ultimatte that are more sophisticated than chromakey, can be used for creating the effect of combining a user's image with that from a background source. The principle of providing the user with a composite video recording combining his/her image with that from a background source is nonetheless maintained.

Figure 9:
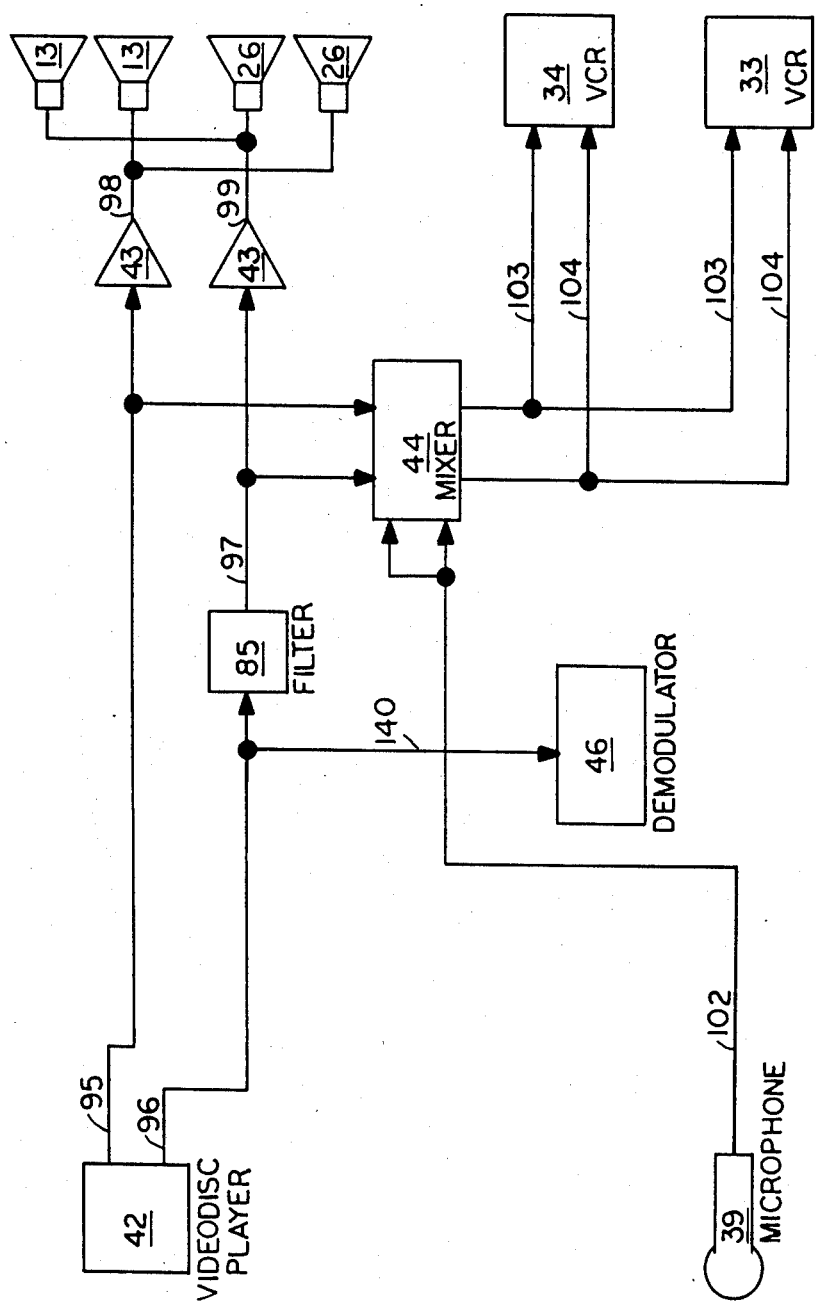
FIG. 9 is a block diagram showing the audio flow in the invention.

The audio flow in the invention is pictured in FIG. 9. Principal sources of audio in the system are the microphone 39 and the two audio channels of the VDP 42. The output 95 of one channel of the VDP (called channel 1 for purposes of this description) is sent to the channel 1 input of an audio mixer 44 and to channel 1 of a power amplifier 43 with a built-in preamplifier.

The other output 96 (called channel 2) of the VDP 42 contains the pulse modulated carrier control signal 140 which carries control instructions that have been encoded and recorded onto the videodisc. This output 96 is split and routed both to a demodulater 46 for translation into a binary data signal 108 and to a notch filter 85, where the sound of the control signal 140 is removed from the audio track. The output 97 of the filter is sent to channel 2 of the audio mixer 44 and to channel 2 of the power amplifier 43.

The output 102 of the microphone 39 is sent to an input of the mixer 44 equipped with an automatic level control function. This allows for a proper balance of audio levels between the user's voice or other sound from the front compartment 7 and the outputs 95,97 of the VDP 42. The outputs 103,104 of the mixer 44 are sent to the respective audio inputs of the VCR 33,34. The outputs 98,99 of the amplifier are sent to the preview speakers 13 and to the booth speakers 26,27.

Figure 10:
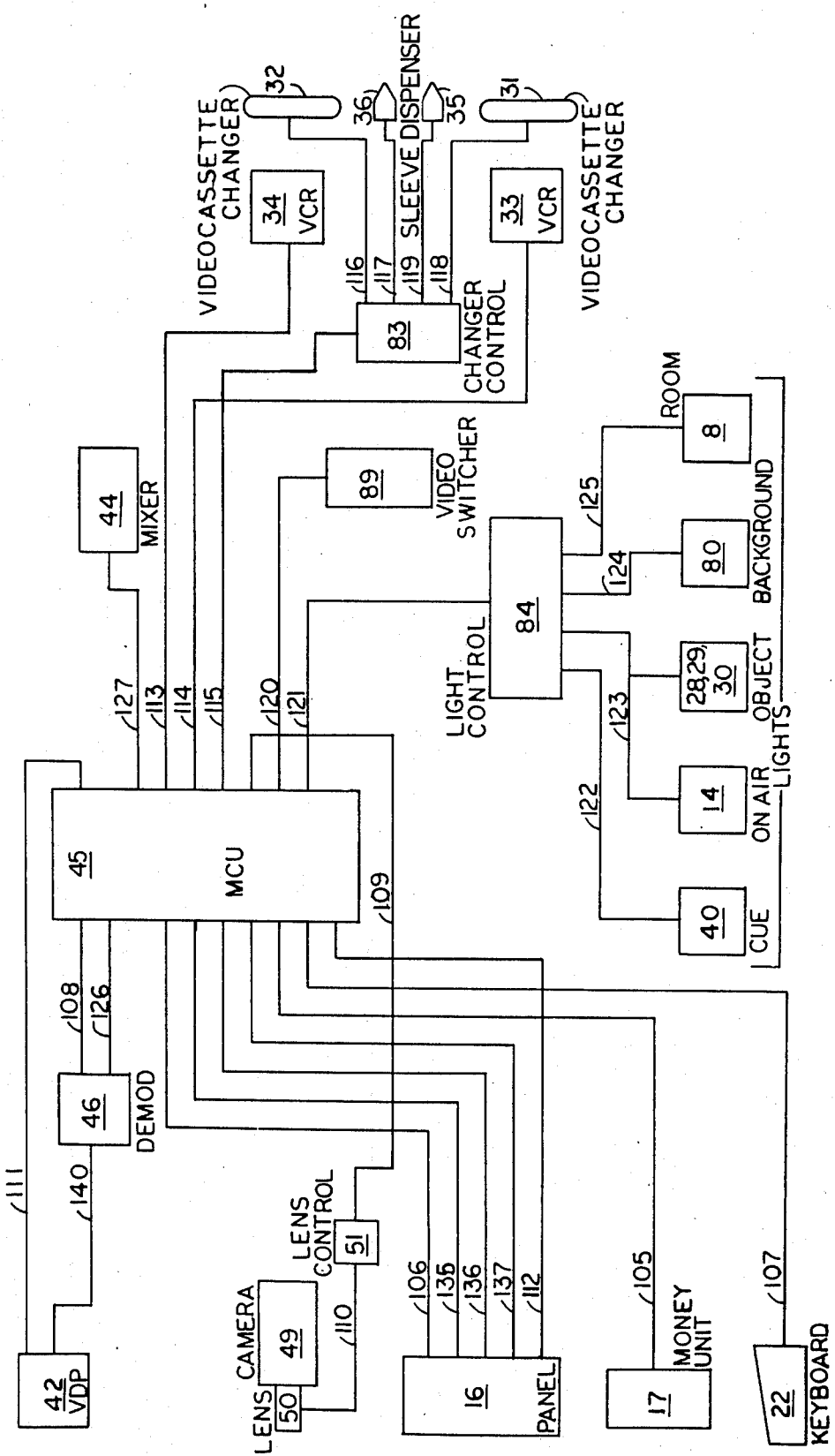
FIG. 10 is a block diagram showing the control flow in the invention.

The control flow diagram, FIG. 10, shows how the functions of the various elements are timed and controlled in the invention. When the user inserts money, token or credit card at the payment unit 17 or otherwise enables the machine a signal 105 is sent to the microcomputer unit (MCU) 45 (See also FIG. 14). This begins the control sequence. Next the user selects a recording format (line 137 -- VHS or Beta videocassettes in the illustrated embodiment), zoom position/- number of persons in the booth (line 136) and desired videodisc-generated background sequence (line 135), all from controls located on the control panel 16. The user then presses Start (line 106) to begin operation.

In a preferred embodiment there is also a prompt displayed on the booth monitor 37 requesting user to enter certain data, name, data etc., on the keyboard 22 to be added to the keyed video signal 88 for recording. This data is stored in random access memory (RAM) 153 (FIG. 14) in the MCU 45 for insertion at the appropriate time as determined by signals 140 encoded on the videodisc and sent to the demodulator 46. The name might appear in a title sequence, as a caption, in the credits, etc.

The MCU 45 also sends a control signal 109 to the zoom control unit 51 which in turn sends a voltage level signal 110 to adjust the servo zoom lens 50 of the camera 49 to the appropriate position. The instruction to do this can come either from the control panel 16 as just described or from the encoded videodisc depending on the application.

At the start of operation the MCU 45 interprets the background selector signal 135 from the control panel 16 and formats it as a frame address signal 111 understandable to the VDP 42. This interface 111 is an RS232C port in the preferred embodiment. In this way the videodisc is advanced to the beginning of the selected background sequence and the sequence commences.

The remaining control functions performed by the MCU 45 preferably are triggered by prerecorded signals 140 encoded on the videodisc in a timed sequence appropriate to the order of events or scenes in the background sequence. Although in the claims the encoding on the videodisc is referred to as controlling the various functions, this is intended in the broad sense to include control through a microcomputer, as is preferred. These functions, variable production parameters, include but are not limited to, light control (line 121) via a light control unit 84; i.e., turning off and on the room light 8 and turning on and off the background flourescent 80, key 28, fill 29 and top 30 lights and the "on air" light 14; starting and stopping (lines 113,114) the selected VCR 33,34 and causing it to rewind and eject the tape at the appropriate time; effectively engaging the chromakeyer and determining which image is to be sent to the recording device and which to the monitors by controlling (line 120) the routing of the switching matrix 89; controlling (line 127) the microphone input 102 of the mixer 44 to keep unwanted sounds from the front compartment 7 from being recorded; changing the focal length of the lens 50 during the recording to allow the size of the user's image in the recorded picture to be varied when appropriate to a given background sequence; signalling the changer control unit 83 to initiate the videocassette changing and sleeve dispensing sequence (see lines 31,32,117,119), to dispense a completed videocassette 64 and protective sleeve 154 and to insert a fresh cassette.

This partial listing of functions reveals the advantage of the preferred embodiment insofar as all timing of functions is controlled by signals encoded on the videodisc in association with each background sequence and specific to that sequence. This allows for maximum flexibility of usage of the invention. For instance the cue lights 40, which serve to notify the user that the camera image is being recorded, can be made to change color when 30 seconds remain and to blink on and off when five seconds remain, this regardless of the duration of the background sequence.

A sequence which requires that the user's image be present in some scenes and absent in others can be achieved by appropriately timed control of the chromakeyer 41 via the switcher 89. Thus the user can be recorded appearing in his or her own interactive video game involving the videodisc, appearing in selected scenes of an existing film or video recording, interacting with live or animated characters, etc. The duration of the dissolve from keyed image to background image and vice versa is also controllable through simple additional circuitry.

This system also allows for elaborate use of the character generator function of the microprocessor 45 to act as "cue cards" to sequentially reveal dialogue or monolog to the user, for song lyrics in "lip-syncing" or "sing along" applications, and for other unspecified purposes. Whole sentences of data (line 140 from the VDP 42 in FIG. 10) can be sent from the videodisc to the MCU 45 to appear at the appropriate time on the booth monitor 37 and/or the recording device 33,34.

This same system of encoding information on the videodisc (represented in FIG. 11 and FIG. 12, described below) or other alternative encoding systems can be used to generate graphics on the booth monitor 37 and/or onto the recording by setting aside part of the RAM 153 on the microproprocessor board 143 (FIG. 14) as a frame buffer. The addition of a graphics pad (not shown) to the keyboard would allow the potential for user-generated graphics as well.

A brief description of the features of the control panel 16 will help explain the functioning of the invention. The recording format selector (line 137 in FIG. 10) allows the user to select what sort of recording the system is to record and dispense. This preferred embodiment illustrates the VHS and Beta format ½" videocassette options, but other formats, including videotape and non-videotape recording options, such as are currently in development or which have yet to be developed, can also be incorporated into the invention without altering the principles involved. Additionally, the selection of PAL, SECAM or NTSC options can also be made at the control panel by the addition of a selector, represented by line 112 in FIG. 10, for this purpose. This is necessary if finished recordings playable in different parts of the world are desired. Such an option would involve the use of multiple-format recording devices which are currently available.

The servo zoom control selector (line 136) enables a user or users occupying the booth to control the size of their image in the recording and on the booth monitor 37. This allows for better picture composition than would be possible without such a control. It is assumed in this discussion that for some background sequences stored on the videodisc it would be inappropriate to have more than one person in the booth, in which circumstances the zoom control function is triggered internally by signals encoded on the videodisc.

The background selector (line 135) allows the user to select from among the background options which have been prerecorded onto the videodisc. The number of such options is a function of how many videodisc players (VDPs) are involved, the length of the sequences and other marketing factors. While booths in different locations can have different selections prerecorded onto the videodisc, ranging from customized recordings specific to one booth location or to a single geographical area to backgrounds which are available in all locations, the nature of the addressing system of the videodisc makes it advantageous that specific addresses be designated as starting points for background sequences on all discs used in the system. This makes it possible for one-button selection of a videodisc address without necessitating reprogramming the MCU 45.

The Start selector represented by line 106 initiates the playing of the videodisc in the VDP 42. Control signals 140 from the VDP in turn start the VCR, turn on the object lights, control the swithcer etc. As an option, the function of the Start selector 156 could also be subsumed by any or all of the other selectors on the control panel 16 or by a signal from the keyboard 22.

Figure 12:
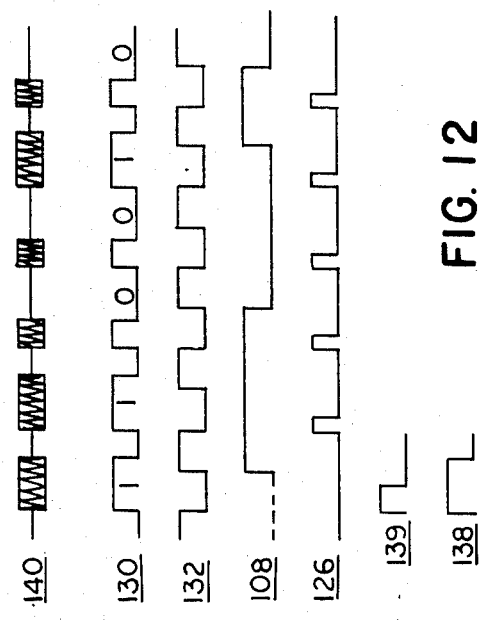
FIG. 12 is a timing diagram detailing the method of pulse modulation and demodulation.
Figure 11:
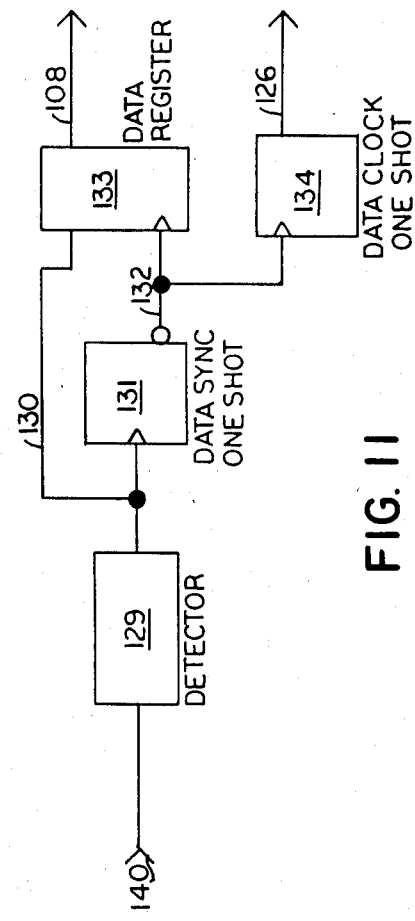
FIG. 11 is a block diagram showing detail of the control signal demodulator.

Control signals encoded in the audio channel of the videodisc are sent to the control signal demodulator 46, FIG. 10. As shown in FIG. 11 and FIG. 12, the input 140 to the demodulator is a burst modulated audio carrier of 19 Khz or other frequency preferably out of the human hearing range but within the band pass of the VDP's 42 audio channel.

The outputs from the demodulator 46 are a clock signal 126 which serves to synchronize the MCU 45 with data, and a binary data signal 108. These are transistor transistor logic (TTL) levels, recognizable by the I/O processor 148 (FIG. 14) of the MCU 45.

In FIG. 11, a detector circuit 129 converts the pulse modulated carrier 140 to detected asynchronous data. This is represented by TTL levels. A data sync one-shot 131 is triggered by the leading edge of a data bit to create the timing (line 132) necessary to decode the bit and provide the trigger for a data clock one-shot 134. A data register 133 decodes the data bit 130 and stores it for the microcomputer I/O processor 148 until the data clock (line 126) signals valid data.

FIG. 12 shows the timing of the signals just described. Additionally, it includes an example of a detected "1 bit" 138 and a detected "0 bit" 139. The system described here, burst modulation of a 19Khz subcarrier using the decoding method illustrated in FIG. 12, allows for a data transmission rate of at least 2400 BAUD. This is more than sufficient for the functions described, including the sending of text data from the videodisc to the character generator function of the MCU 45.

Figure 13:
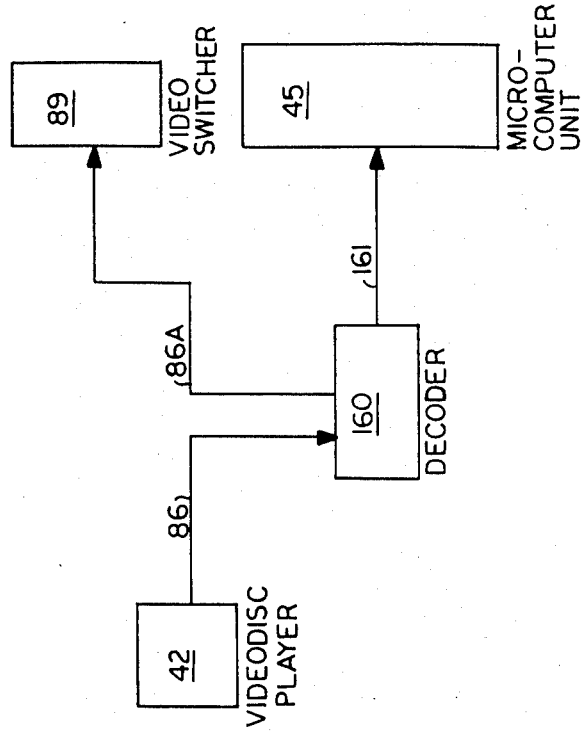
FIG. 13 is a block diagram showing an alternative method of data encoding.

An alternative method of encoding control signals and text data onto the videodisc is to use vertical interval encoding which utilizes one or more of the un-dedicated lines of the vertical interval of the video signal. FIG. 13 shows the video output signal 86 of the VDP 42 going to a vertical interval decoder 160 and looping through to the switcher 89 via a line 86A. The vertical interval decoder 160 translates the data presented during the vertical interval to the ASCII format and sends it to the MCU 45 via an RS232C communications line 161. This system is not as fast and is more expensive than the pulse modulated carrier system described above, but it has the advantage that it is already in use for other purposes and can be accomplished with off-the-shelf hardware.

Without departing from the basic principles of the invention, there are other methods whereby the control of sequence and timing of the various apparatus as described above (FIG. 10) can be achieved in conjunction with specific background sequences. One such alternative would be to download such control information to the MCU 45 prior to the beginning of recording, either from the videodisc or from an independent computer recording medium such as a flexible disk. Another method would be to program the control sequence into the firmware 147 of the MCU 45. This latter method does not allow the flexibility of the system described in the preferred embodiment, as timing could not be varied for the various sequences.

Figure 14:
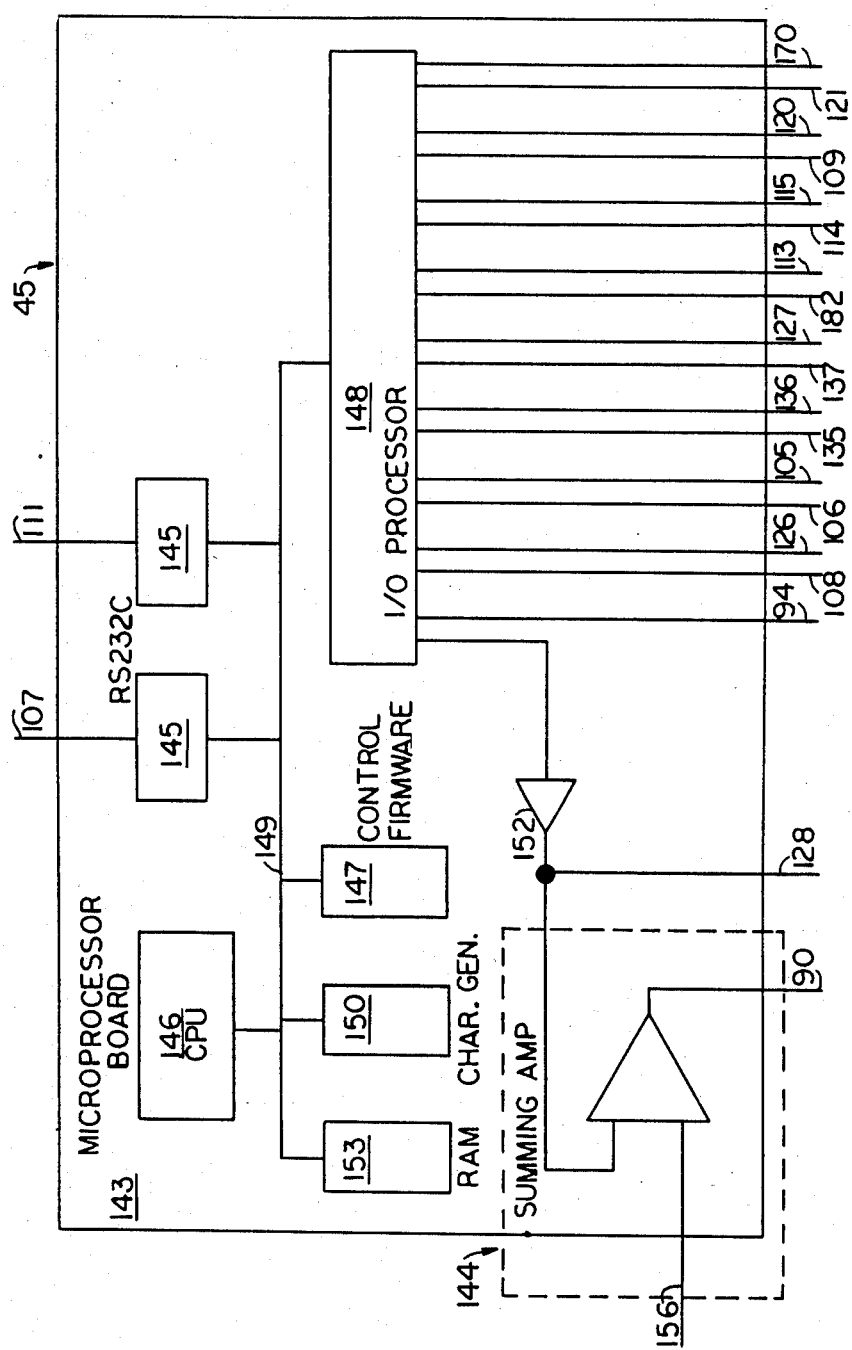
FIG. 14 is block diagram showing detail of the microcomputer unit.

The central control element of the invention is the microcomputer unit (MCU) 45, as already describeld in part and as detailed in FIG. 14. This comprises a microprocessor board 143 and a summin amplifier 144. The microprocessor 143 includes at least two RS232C communications ports 145, a central processing unit 146, system control firmware (read only memory) 147, random access memory (RAM) 153, and an input/output I/O processor 148. These units are interconnected by a bi-directional data bus 147.

The main purpose of the microprocessor board 143 is to control the functions of the elements of the system, e.g. VRCs, cassette changers, lights, etc. (see FIG. 10), prompted by timing signals encoded on the videodisc audio channel. These are demodulated as in FIG. 12 and received by the I/O processor 148 in digital form via input 108. The microprocessor 143 also receives commands from the control panel 16, the keyboard 22 and an enable signal from the coin/token/currency/credit card unit 17.

In this preferred embodiment the microprocessor is equipped with a character generator function (character generator 47 in FIG. 8) which involves a character generator ROM 150 and uses control firmware 147 to allow the MCU 45 to add text to the video signal 156. One input 107 data source for the character generator 47 is the keyboard 22, another 108 is the encoded videodisc, and a third source is ROM 147 storage.

The summing amplifier 144 provides for the addition of the character generator signals 128 to the video output 156 of the switcher 89. The output 90 of the summing amplifier 144 is then itself routed to the switcher 89. The character generator signals 128 come from a video amplifier 152, which converts the TTL levels from the I/O processor 148 to the proper video levels.

A control option that should be mentioned is the use of prompts from the MCU 45 on the booth monitor 37 as a means of communicating control instructions to the user, and the use of the keyboard 22 to respond to these prompts.

Figure 15:
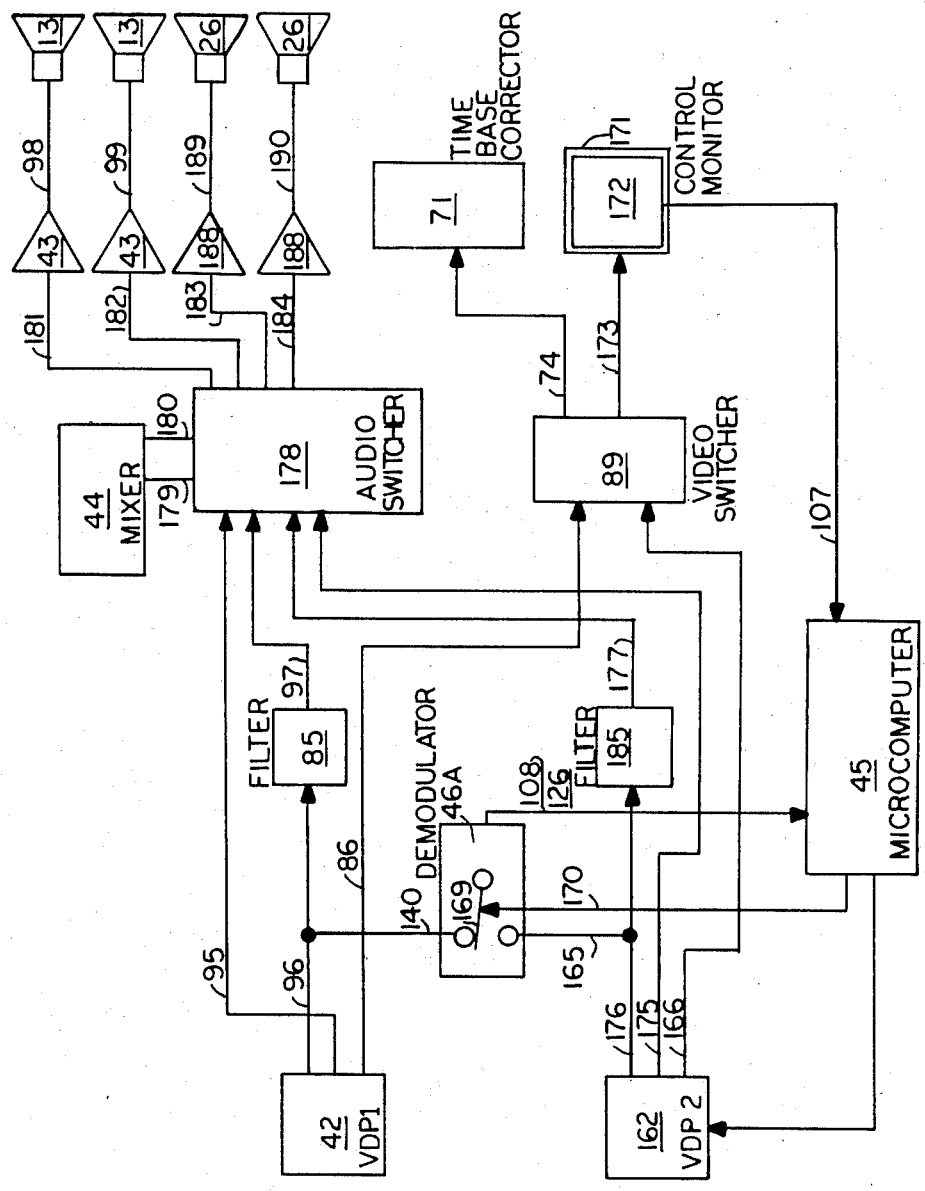
FIG. 15 is a block diagram showing the use of a second videodisc player and showing an alternative to the control panel and keyboard, a control monitor with touch sensitive screen.

FIG. 15 shows an alternative to the control panel 16 and keyboard 22, i.e. the use of a control monitor 171 with a touch sensitive screen 172 which transmits data (line 107) to the MCU 45. The control monitor, which is mounted in place of the control panel 16 in the main panel 2, receives its video input 173 from the switcher 89. A possible application of this configuration is the interactive use of a VDP, but since the disc space for such an interactive system is considerable, a second VDP (VDP2) 162 is highly desireable for this purpose. The video output 166 of VDP2 162 is sent to the switcher 89 and from there the output of either VDP 42,162 can be sent via line 173 to the control monitor 171. The VDP2 162 is controlled by the MCU 45 via an RS232C interface represented by line 163.

Since it is advantageous to have the functions of multiple VDPs interchangeable, the audio output 176 of VDP2 containing control data (respresented by line 165) is routed to the demodulator 46A which is modified to include a switch 169. Through control (line 170) of this switch 169 the MCU 45 can govern which audio input to the demodulator is active at a given moment. In this configuration also, a switcher output 74 is sent to the TBC to allow selection of which VDP output is to be corrected.

The audio output 176 of channel 2 of VDP2 is sent through a second notch filter 185 and then on via a line 177 to an audio switching matrix 178. Also going into this audio switcher 178 are the audio outputs 95,97 of VDP1 and the output 175 of channel 1 of VDP2. Two outputs 179,180 of the audio switcher 178 are routed to the mixer 44 to provide audio for the recording devices. Additional outputs 181,182 from the switcher 178 are sent to an amplifier 43 for the preview monitor speakers 13. A final two outputs 183,184 are sent to a second amplifier 188 for the booth monitor speakers 26 The booth speakers can double as audio source for the control monitor 171.

Without the involvement of the camera 49 this invention can serve as an automatic mastering system for making copies of prerecorded sequences from the videodisc or from any other recorded source onto a videocassette or other recording medium This has the advantage that a recording can be made at the point of sale after a decision has been made to purchase a given sequence.

Without the involvement of the chromakeyer 41, the invention becomes a simple but novel audio/video recording and dispensing booth. There would be no need for a videodisc player, a time base corrector, a back-lit colored background or a switching matrix. The various features described in the preferred embodiment, such as the MCU 45, the character generator 47, the keyboard 22, the booth monitor 37, the zoom lens control 51, and the timing and control system, are all options which increase the scope and application of the invention.

It is also possible for the concept of a self-contained booth per se to be modified without compromising certain novel principles of the invention, such as the use of control data specific to a particular background sequence. The only equipment shown in the preferred embodiment as being in the rear compartment 3 which must necessarily be located adjacent to the user is the camera 49, booth monitor 37 and other items shown in FIG. 5. Recording equipment, switchers, video processing devices, vending and other equipment with which the user does not directly interact need not be located adjacent to the user, and can in fact be centrally located to function with more than one user and camera at a time.

In the appended claims certain terms are used which should be understood in their broad sense. The term "vending" as used in the claims may include dispensing to the user involving further human interaction. The term "enclosure" broadly refers to any form of area defined for the user of the invention to occupy. The term "self-service" is similarly intended in a broad sense to imply that the user has some degree of control of the making of a video recording.

The terms "background sequence" and "video sequence" are intended to describe any image or series of images with which the user's image may be composited. The term "composite" is used to describe any image which is composed partially of the user's image and partially of an image from a separate background source.

"Payment" as used in the claims is intended to describe any practible means of exacting remuneration, including any appropriate system for transfer of funds or credit. The term "format" as used in the specifications and in the claims is used to describe any of various types and sizes of videotape and videotape transport systems, and in another sense to describe any of various international television broadcast systems with which a recording is compatible.

The following is a list of factored equipment (OEM) described in the preferred embodiment:
VIDEODISC PLAYER 42,162: Pioneer LD-V6000
VHS VIDEO PLAYER/RECORDER 34: JVC BR-6400U
BETA VIDEO PLAYER/RECORDER 33: Sony SLO-420
Modified for remote control of eject function.
VIDEO CHROMAKEYER 41: Sony CRK-2000
VIDEO CAMERA 49: JVC BY-110 w/servo zoom lens
BOOTH AND PREVIEW MONITORS 37,12: Panasonic CT-1320M
MICROPHONE 39: Electro-voice RE-15
CREDIT CARD DECODER 17: Mag Tek MT-215
VIDEO SWITCHING MATRIX 89: Utah Scientific VX-10/10B w/VO-10B
AUDIO SWITCHING MATRIX 178: Utah Scientific AX-10/10B w/AO-10B
TIME BASE CORRECTOR 171: Nova Systems Nova-500
VERTICAL INTERVAL DECODER 160: EEG Enterprises DE202
KEYBOARD 22: RCA VP-3301
CONTROL MONITOR 171: Sony PVM-1271
TOUCH SENSITIVE SCREEN 172: Advanced Touch Systems ATS-460

We claim:
1. A self-service video system for enabling one or more users to produce a video recording with the user's image in combination with a selected prerecorded background sequence, and for vending the resulting video recording, comprising:

enclosure means for receiving at least one user in position to be video recorded;

a video camera in association with and oriented toward the enclosure means for use in making a video recording of the user:

background storage means for storing the selected prerecorded background sequence;

compositing means for positioning said selected prerecorded background sequence to appear in a composite picture with the user's image in the video recording to be produced;

video recording means, including means for recording the composite image on a vendable video recording medium for a preselected interval;

audio recording means for mixing and recording onto the video recording medium (a) audio from the selected prerecorded background sequence and (b) audio input from the user; and vending means for presenting to the user a completed video recording on said vendable video recording medium, after completion of production of the recording.

2. The self-service video system of claim 1, wherein the vendable video recording medium comprises a videocassette.

3. The self-service video system of claim 2, further including cassete storage and transport means for storing a plurality of videocassettes and for transporting a videocassete to a position for recording by the video recording means.

4. The self service video system of claim 2, further including tape format selection means for enabling the user, prior to recording, to select a desired videotape format on which the recording will be made.

5. A self-service video system for enabling one or more users to produce a video recording with the user's image in combination with a selected prerecorded background sequence, and for vending the resulting video recording, comprising:

enclosure means for receiving at least one user in position to be video recorded;

a video camera in association with and oriented toward the enclosure means for use in making a video recording of the user;

background storage means for storing the selected prerecorded background sequence;

compositing means for positioning said selected prerecorded background sequence to appear in a composite picture with the user's image in the video recording to be produced, said compositing means comprising background matte means for presenting a backdrop of a preselected color in the enclosure means behind the user and in view of the video camera and a keying system in connection with the video recording means, having means for positioning the preselected background sequence in all areas of camera view where the preselected color appears to the camera;

video recording means, including means for recording the composite image on a vendable video recording medium for a preselected interval; and vending means for presenting to the user a completed video recording on said vendable video recording medium, after completion of production of the recording.

6. The self-service video system of claim 5, wherein the background matte means comprises a backlighted translucent colored panel.

7. The self-service video system of claim 1, wherein said background storage means includes means for storing a plurality of selectable prerecorded background sequences, and further including background select means for enabling the user to select a desired prerecorded sequence for the video recording to be produced.

8. A self-service video system for enabling one or more users to produce a video recording with the user's image in combination with a selected prerecorded background sequence, and for vending the resulting video recording, comprising:

enclosure means for receiving at least one user in position to be video recorded;

a video camera in association with and oriented toward the enclosure means for use in making a video recording of the user;

background storage means for storing a plurality of selectable prerecorded background sequences, and further including background select means for enabling the user to select a desired prerecorded sequence for the video recording to be produced;

previewing means for enabling the user to preview at least a portion of each of the stored prerecorded background sequences prior to selection of a background sequence for the video recording to be produced;

compositing means for positioning said selected prerecorded background sequence to appear in a composite picture with the user's image in the video recording to be produced;

video recording means, including means for recording the composite image on a vendable video recording medium for a preselected interval; and vending means for presenting to the user a completed video recording on said vendable video recording medium, after completion of production of the recording.

9. A self-service video system for enabling one or more users to produce a video recording with the user's image in combination with a selected prerecorded background sequence, and for vending the resulting video recording, comprising:

enclosure means for receiving at least one user in position to be video recorded;

a video camera in association with and oriented toward the enclosure means for use in making a video recording of the user;

background storage means for storing the selected prerecorded background sequence;

compositing means for positioning said selected prerecorded background sequence to appear in a composite picture with the user's image in the video recording to be produced;

video recording means, including means for recording the composite image on a vendable video recording medium for a preselected interval;

video monitor means including a video screen visible to the user while the video recording is being produced, for enabling the user to view the video recording as it is being produced; and vending means for presenting to the user a completed video recording on said vendable video recording medium, after completion of production of the recording.

10. The self-service video system of claim 9, wherein the video monitor means includes a half-mirror positioned obliquely in front of the video camera such that the camera receives light through the half-mirror, with the video screen adjacent to the half-mirror in position to reflect the image from the screen toward the user.

11. The self-service video system of claim 9, further including character generator means for generating readable text to be superimposed on the video screen while the video recording is being produced, but to be excluded from the video recording.

12. The self-service video system of claim 11, wherein said background storage means includes means for storing a plurality of selectable prerecorded background sequences, and further including background select means for enabling the user to select a desired prerecorded background sequence for the video recording to be produced, and wherein the readable text generated by the character generator means and presented on the video screen relates particularly to the background sequence selected.

13. A self-service video system for enabling one or more users to produce a video recording with the user's image in combination with a selected prerecorded background sequence, and for vending the resulting video recording, comprising:
  enclosure means for receiving at least one user in position to be video recorded;
  a video camera in association with and oriented toward the enclosure means for use in making a video recording of the user;
  background storage means for storing the selected prerecorded background sequence;
  compositing means for positioning said selected prerecorded background sequence to appear in a composite picture with the user's image in the video recording to be produced;
  video recording means, including means for recording the composite image on a vendable video recording medium for a preselected interval;
  character generator means for generating readable text to be superimposed on the video recording being produced, in accordance with the selection of the user, and including user interaction means enabling user selection of said characters; and
  vending means for presenting to the user a completed video recording on said vendable video recording medium, after completion of production of the recording.

14. The self-service video system of claim 13, wherein the user interaction means includes a keyboard and associated means for enabling the user to insert a desired message on the recording to be produced.

15. The self-service video system of claim 1, including a microphone near the user.

16. A self-service video system for enabling one or more users to produce a video recording with the user's image in combination with a selected prerecorded background sequence, and for vending the resulting video recording, comprising:
  enclosure means for receiving at least one user in position to be video recorded;
  a video camera in association with and oriented toward the enclosure means for use in making a video recording of the user;
  background storage means for storing the selected prerecorded background sequence;
  compositing means for positioning said selected prerecorded background sequence to appear in a composite picture with the user's image in the video recording to be produced;
  said background storage means comprising a videodisc and videodisc player in association with the compositing means;
  video recording means, including means for recording the composite image on a vendable video recording medium for a preselected interval; and
  vending means for presenting to the user a completed video recording on said vendable video recording medium, after completion of production of the recording.

17. The self-service video system of claim 16, wherein the videodisc includes encoded data for controlling the compositing means with frame-accurate timing, and including associated decoding equipment for decoding the encoded data.

18. The self-service video system of claim 16, wherein the videodisc includes encoded data for controlling a servoadjustable zoom lens in conjunction with the video camera.

19. The self-service video system of claim 1, further including automatic system enabling means for allowing the user to begin the production of the video recording upon having made an appropriate preset payment.

20. The self-service video system of claim 1, wherein the enclosure means comprises a booth for privacy and some degree of sound isolation of the user from exterior sounds, and including equipment housing means adjacent to the booth and containing the video camera.

21. A video system for enabling a user to produce a video recording of his or her own image and for vending the resulting video recording to the user, comprising:
  a recording area for accommodating at least one user;
  a video camera oriented toward the recording area and connected video recording means for recording the user's image on a vendable videocassette for a preselected interval;
  audio recording means in connection with the video recording means, for producing an audio recording of the user on said videocassette, and the recording area including isolation means for isolating the user to some degree from exterior sounds;
  cassette storage and transport means for storing a plurality of videocassettes and for transporting a videocassette to a position for recording by the video recording means; and
  vending means adjacent to the recording area for presenting to the user a complete video recording on the videocassette, after completion of production of the recording.

22. The video system of claim 21, further including system enabling means in association with the video recording means for accepting an appropriate payment in a selected form from the user prior to beginning the production of the video recording, and for initiating the production in response to such payment.

23. The video system of claim 22, wherein the system enabling means includes a credit card reader.

24. The video system of claim 21, wherein the recording area comprises a booth having a camera wall at which the video camera is positioned.

25. A video system for enabling a user to produce a video recording of his or her own image and for vending the resulting video recording to the user, comprising:
  a recording area for accommodating at least one user;
  a video camera oriented toward the recording area and connected video recording means for recording the user's image on a vendable videocassette for a preselected interval, the recording area comprising a booth having a camera wall at which the video camera is positioned;

monitor means for displaying to the user his real time image while the video recording is being made;

cassette storage and transport means for storing a plurality of videocassettes and for transporting a videocassette to a position for recording by the video recording means; and vending means adjacent to the recording area for presenting to the user a completed video recording on the videocassette, after completion of production of the recording.

26. The video system of claim 25, wherein the monitor means comprises a half-mirror mounted obliquely in front of the video camera such that the video camera receives light through the half-mirror, and a video monitor screen positioned adjacent to the half-mirror, out of direct view of the user, such that the user sees images from the video screen reflected off the half-mirror.

27. A video system for enabling a user to produce a video recording of his or her own image and for vending the resulting video recording to the user, comprising:

a recording area for accommodating at least one user;

a video camera oriented toward the recording areas and connected video recording means for recording the user's image on a vendable videocassette for a preselected interval;

monitor means for displaying to the user his real time image while the video recording is being made;

cassette storage and transport means for storing a plurality of videocassettes and for transporting a videocassette to a position for recording by the video recording means; and vending means adjacent to the recording area for presenting to the user a completed video recording on the videocassette, after completion of production of the recording.

28. The video system of claim 27, wherein the monitor means comprises a half-mirror mounted obliquely in front of the video camera such that the video camera receives light through the half-mirror, and a video monitor screen positioned adjacent to the half-mirror, out of direct view of the user, such that the user sees images from the video screen reflected off the half-mirror.

29. A video system for enabling a user to produce a video recording of his or her own image and for vending the resulting video recording to the user, comprising:

a recording area of accommodating at least one user;

a video camera oriented toward the recording area and connected video recording means for recording the user's image on a vendable videocassette for a preselected interval;

cassette storage and transport means for storing a plurality of videocassettes and for transporting a videocassette to a position for recording by the video recording means;

vending means adjacent to the recording area for presenting to the user a completed video recording on the videocassette, after completion of production of the recording; and the recording area including a wall with a cassette vending slot, and wherein the vending means includes cassette unloading means for moving the completed videocassette recording from the medium storage and transport means laterally through the vending slot.

30. The video system of claim 21, wherein the cassette storage and transport means comprises an endless conveyor with storage slots for holding the videocassettes, and including friction drive means for moving videocassettes out of the endless conveyor to be recorded.

31. A video system for enabling a user to produce a video recording of his or her own image and for vending the resulting video recording to the user, comprising:

a recording area for accommodating at least one user;

a video camera oriented toward the recording area and connected video recording means for recording the user's image on a vendable videocassette for a preselected interval;

background storage means for storing a plurality of prerecorded background sequences, compositing means for causing a selected prerecorded background sequence to appear in a composite picture with the user's image in the video recording to be produced, and background select means for enabling the user to select a desired prerecorded background sequence for the video recording to be produced;

cassette storage and transport means for storing a plurality of videocassettes and for transporting a videocassette to a position for recording by the video recording means; and vending means adjacent to the recording area for presenting to the user a completed video recording on the videocassette, after completion of production of the recording.

32. The video system of claim 31, wherein said compositing means comprises background matte means for presenting a backdrop of a preselected color in the recording area behind the user and in view of the video camera and a keying system in connection with the video recording means, having means for positioning the preselected background sequence in all areas of camera view where the preselected color appears to the camera.

33. The video system of claim 31, further including previewing means for enabling the user to preview at least a portion of each of the stored prerecorded background sequences prior to selection of a background sequence for the video recording to be produced.

34. A method for producing a video recording of a subject composited with a selected prerecorded background sequence and vending the resulting video recording, comprising:

providing a recording area;

storing a plurality of selectable prerecorded background sequences in a storage means, and providing the subject with a means for selection of a desired background sequence;

after selecting a background sequence, activating a recording system including a video camera aimed at the subject recording area, and making a recording of the subject's moving image on a vendable video recording medium while adding the preselected background sequence on the medium to produce a composite video recording with the subject and the background; and vending the completed video recording to the user.

35. The method of claim 34, wherein the storage means comprises a videodisc and videodisc player.

36. The method of claim 35, wherein variable production parameters are controlled by encoded data on the videodisc, in accordance with the timing of events and images occurring in the background sequence.

37. A method for producing a video recording of a subject composited with a selected prerecorded background sequence and vending the resulting video recording, comprising:

providing a recording area;

storing at least one prerecorded background sequence in a storage means;

activating a recording system including a video camera aimed at the subject in the recording area, and making a recording of the subject's moving image on a vendable video recording medium while adding the preselected background sequence on the medium to produce a composite video recording with the subject and the background;

the preselected background sequence being added by keying, and wherein a preselected color is provided behind the subject in view of the video camera, so that the background sequence is recorded in all areas of camera view where the color appears to the camera; and vending the completed video recording to the user.

38. The method of claim 34, wherein the recording system is activated only upon the making of a preset payment by the subject.

39. The method of claim 34, wherein the video recording medium comprises a videocassette.

40. The method of claim 39, wherein the storage means comprises a videodisc and videodisc player.

41. A method for producing a video recording of a subject composited with a selected prerecorded background sequence and vending the resulting video recordin, comprising:

providing a recording area;

storing at least one prerecorded background sequence in a storage means;

activating a recording system including a video camera aimed at the subject in the recording area, and making a recording of the subject's moving image on a vendable video recording medium while adding the preselected background sequence on the medium to produce a composite video recording with the subject and the background:

the video camera including a servo-adjustable zoom lens, and the method including controlling the zoom lens in accordance with the timing of events and images in the background sequence, so that the focal length of the lens and the consequent size of the subject's image is correlated as desired with said events and images; and vending the completed video recording to the user.

42. The method of claim 41, wherein the storage means comprises a videodisc and videodisc player, the videodisc having encoded control data for controlling the focal length of the zoom lens.

43. A method for producing a composite video recording of a user in combination with a selected prerecorded video sequence, comprising:

displaying a composite video image of the prerecorded video sequence in combination with the user's real time image within view of the person;

simultaneously recording said composite video image on a vendable video recording medium; and said selected prerecorded video sequence being displayed with prompt messages for the person being recorded, which messages are not recorded on said recording medium.

44. A method for producing a composite video recording of a user in combination with a selected prerecorded video sequence, comprising:

displaying a composite video image of the prerecorded video sequence in combination with the user's real time image within view of the person;

the composite video image being displayed to the user by reflection of a video monitor screen off a half-mirror positioned obliquely in front of a video camera which is directed at the user and which receives light through the half-mirror, so that the user can watch the monitor screen while looking in the direction of the camera; and simultaneously recording said composite video image on a vendable video recording medium.

45. A method for producing a composite video recording of a person in combination with a selected prerecorded video sequence using video recording apparatus, said method comprising:

prerecording a plurality of predetermined control signals in accordance with respective scenes and events occurring in said prerecorded video sequence;

making a video recording including a composite video image of the prerecorded sequence and of the person's real time image on a vendable video recording medium; and utilizing said predetermined control signals on said prerecorded video sequence to control the video recording apparatus in accordance with the timing of events and images in the prerecorded video sequence during recording.

46. A method according to claim 45, wherein said selected prerecorded video sequence is displayed within view of the user along with prompt messages for the user, which messages are not recorded on said recording medium.

47. A method according to claim 45, wherein the video recording apparatus includes a servo-adjustable zoom lens on a video camera, and said predetermined control signals are used to control the focal length of the zoom lens.

48. A method according to claim 45, wherein the composite video image is formed by matting the user's image and the prerecorded video sequence into the composite image at selected times in accordance with respective scenes and events in the prerecorded video sequence, and wherein said prerecorded control signals are used to control the enabling and disabling of said matting.

49. A method according to claim 45, wherein a character generator is used to produce messages, and including displaying the prerecorded video sequence within the view of the user along with said messages from the character generator, which messages are not recorded on said recording medium, and including controlling the character generator with said predetermined control signals.

50. A method according to claim 45, wherein the predetermined control signals and the prerecorded video sequence are both recorded on a videodisc.

51. A method according to claim 50, wherein the control signals comprise data encoded on an audio track of the videodisc.

52. A method according to claim 50, wherein a plurality of selectable prerecorded video sequences are stored on the videodisc, with different control signals recorded on the videodisc corresponding to different video sequences, said control signals containing timing instructions appropriate to the particular events and images of the particular video sequence.

53. A method according to claim 45, wherein the predetermined control signals are recorded on a computer data storage medium, and with different control signals recorded on said storage medium corresponding to different prerecorded video sequences, said control signals containing timing instructions appropriate to the particular events and images of the particular video sequence.

54. A method according to claim 45, wherein said prerecorded control signals are used to control the timing whereby the compositing of the user's image with the prerecorded video sequence is enabled and disabled, in accordance with the particular events and images of the particular video sequence.

55. A method according to claim 45, wherein said prerecorded control signals are used to control a cue light, which cues the user regarding the beginning and end of the recording.

56. Apparatus for producing a composite video recording of a person in combination with a selected prerecorded video sequence, comprising:
   means for displaying a composite video image of the prerecorded video sequence in combination with the person's real time image within view of the person; and means for recording said composite video image on a vendable video recording medium;
   means for displaying prompt messages for the person being recorded, which messages are not recorded on said recording medium, said prompt messages being displayed simultaneously with the selected prerecorded image; and
   means for vending a composite video recording of the user.

57. A system for producing a composite video recording of a user in combination with a selected prerecorded video sequence, comprising:
   a videodisc player and associated videodisc having a plurality of selectable prerecorded background sequences and having encoded control data;
   means for user selection of a background sequence;
   video camera means for providing an image of the user; compositing means for combining the selected background sequence with the user's image from the video camera means at selected times and for selected intervals, to form a composite image;
   video recording means for making a recording including the composite image, onto a video recording medium;
   means providing for variation in production parameters in the production of said composite video recording; and
   control means for receiving said encoded control data and for controlling said variable production parameters in accordance with the timing of events occurring in the selected background sequence.

58. The system of claim 57, wherein said variable production parameters controlled from the disc-encoded data include a servocontrollable zoom lens in association with said video camera return means.

59. The system of claim 57, wherein said variable production parameters controlled from the disc-encoded data include the enabling and disabling of said compositing means.

60. The system of claim 57, further including a video monitor screen visible to the user and wherein said variable production parameters controlled from the disc-encoded data include a character generator means for inserting readable text onto said video monitor screen at pre-selected times and with pre-selected content as determined by said disc-encoded data.

61. The system of claim 57, wherein said variable production parameters controlled from the disc-encoded data include video switching means for directing the recording means to record either said composite image or said background sequence alone.

62. The system of claim 57, further including audio recording means in connection with the video recording means, for producing an audio recording of the user on said video recording medium.

* * * * *

REEXAMINATION CERTIFICATE (1746th)
United States Patent [19]
Bloch et al.

[11] B1 4,688,105
[45] Certificate Issued  Jul. 14, 1992

[54] VIDEO RECORDING SYSTEM

[75] Inventors: Arthur R. Bloch, Oakland; Kenneth A. Bloch, Northridge, both of Calif.

[73] Assignee: Short Takes, Inc.

Reexamination Request:
No. 90/002,159, Oct. 9, 1990

Reexamination Certificate for:
Patent No.: 4,688,105
Issued: Aug. 18, 1987
Appl. No.: 732,869
Filed: May 10, 1985

[51] Int. Cl.⁵ .............................................. H04N 5/76
[52] U.S. Cl. .................... 358/335; 358/342; 360/55; 360/137; 369/12
[58] Field of Search ............ 358/310, 335, 342, 22; 360/55, 137; 369/12; 354/290, 291

[56] References Cited

U.S. PATENT DOCUMENTS

| | | | |
|---|---|---|---|
| 3,595,987 | 7/1971 | Vlahos | 178/5.2 R |
| 4,007,487 | 2/1977 | Vlahos | 358/22 |
| 4,100,569 | 7/1978 | Vlahos | 358/22 |
| 4,261,012 | 4/1981 | Maloomian | 358/93 |
| 4,344,085 | 8/1982 | Vlahos | 358/22 |
| 4,789,907 | 12/1988 | Fischetti et al. | 360/33.1 |

OTHER PUBLICATIONS

"Video Moonlighter Newsletter" vol. 1, No. 3 (1982).
Series of five "The Video Booth" articles of flyers, undated, publication date unknown.
"Video" vol. VI No. 12 p. 22 Mar. 1983.
Electronic Imaging Techniques pp. 144–160—1977.
NAB Engineering Handbook Sixth Ed. 1975.
IBE International Broadcast Engineer vol. II #173 Sep. 1980.
Basic Electronic & Video Systems Fifth Ed. 1984.

Primary Examiner—Robert L. Richardson

[57] ABSTRACT

A video recording system enables self-service production of vended videocassette recordings to a user or customer, with user control of several features. Preferably the system includes forming a composite video picture with the user's image in combination with a user-selected background sequence. Compositing may be by chromakeying, with a key color as a backdrop behind the user in a recording booth. As the composite video recording is made the user preferably is able to watch the composite image on a monitor, which may also include prompting messages for the user. A preferred control for the system involves control data encoded on a videodisc, which also holds a plurality of selectable background sequences.

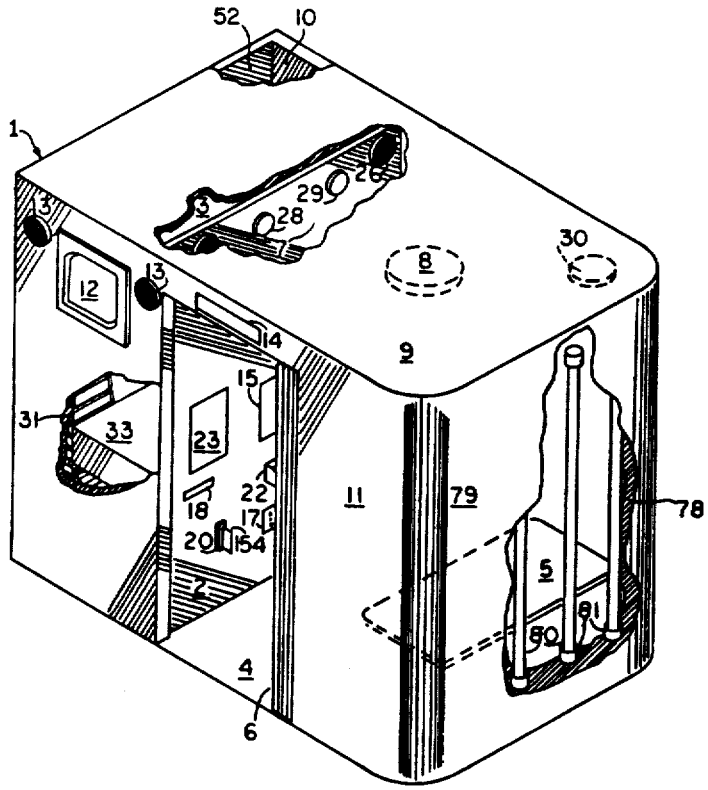

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 26, 43 and 44 is confirmed.

Claims 21, 22, 24, 25, 27-30 and 45-55 are cancelled.

Claims 1, 5, 8, 9, 13, 16, 23, 31, 34 and 37, 41, 56, 57 are determined to be patentable as amended.

Claims 2-4, 6, 7, 10-12, 14, 15, 17-20, 32, 38-40, 42 and 58-62, dependent on an amended claim, are determined to be patentable.

1. A self-service video system for enabling one or more users to produce a video recording with the user's image in combination with a selected prerecorded background sequence, and for vending the resulting video recording, comprising:
    enclosure means for receiving at least one user in position to be video recorded, *in the form of a booth capable of affording privacy and some degree of sound isolation;*
    [a] video camera *means* in association with and oriented toward the enclosure means for use in making a video recording of the user *without intervention of any person other than the user;*
    background storage means for storing the selected prerecorded background sequence;
    compositing means for positioning said selected prerecorded background sequence to appear in a composite picture with the user's image in the video recording to be produced;
    video recording means, including means for recording the composite image on a vendable video recording medium for a preselected interval;
    audio recording means for mixing and recording onto the video recording medium (a) audio from the selected prerecorded background sequence and (b) audio input from the user; and
    vending means for *automatically* presenting to the user a completed video recording on said vendable video recording medium, after completion of production of the recording.

5. A self-service video system for enabling one or more users to produce a video recording with the user's image in combination with a selected prerecorded background sequence, and for vending the resulting video recording, comprising;
    enclosure means for receiving at least one user in position to be video recorded, *in the form of a booth capable of affording privacy and some degree of sound isolation;*
    [a] video camera *means* in association with and oriented toward the enclosure means for use in making a video recording of the user *without intervention of any person other than the user;*
    background storage means for storing the selected prerecorded background sequence;
    compositing means for positioning said selected prerecorded background sequence to appear in a composite picture with the user's image in the video recording to be produced; saidcompositing means comprising background matte means for presenting a backdrop of a preselected color in the enclosure means behind the user and in view of the video camera and a keying system in connection with the video recording means, having means for positioning the preselected background sequence in all areas of camera view where the preselected color appears to the camera;
    video recording means, including means for recording the composite image on a vendable video recording medium for a preselected interval; and
    vending means for *automatically* presenting to the user a completed video recording on said vendable video recording medium, after completion of production of the recording.

8. A self-service video system for eanbling one or more users to produce a video recording with the user's image in combination with a selected prerecorded background sequence, and for vending the resulting video recording, comprising;
    enclosure means for receiving at least one user in position to be video recorded, *in the form of a booth capable of affording privacy and some degree of sound isolation;*
    [a] video camera *means* in association with and oriented toward the enclosure means for use in making a video recording of the user *without intervention of any person other than the user;*
    background storage means for storing a plurality of selected prerecorded background sequences, and further including background select means for enabling the user to select a desired prerecorded sequence for the video recording to be produced;
    previewing means for enabling the user to preview at least a portion of each of the stored prerecorded background sequences prior to selection of a background sequence for the video recording to be produced;
    compositing means for positioning said selected prerecorded background sequence to appear in a composite picture with the user's image in the video recording to be produced;
    video recording means, including means for *automatically* recording the composite image on a vendable video recording medium for a preselected interval; and
    vending means for *automatically* presenting to the user a completed video recording on said vendable video recording medium, after completion of production of the recording.

9. A self-service video system for enabling one or more users to produce a video recording with the user's image in combination with a selected prerecorded background sequence, and for vending the resulting video recording, comprising:
    enclosure means for receiving at least one user in position to be video recorded, *in the form of a booth capable of affording privacy and some degree of sound isolation;*

[a] video camera *means* in association with and oriented toward the enclosure means for use in making a video recording of the user *without intervention of any person other than the user;* background storage means for storing the selected prerecorded background sequence;

compositing means for positioning said selected prerecorded background sequence to appear in a composite picture with the user's image in the video recording to be produced;

video recording means, including means for *automatically* recording the composite image on a vendable video recording medium for a preselected interval;

video monitor means including a video screen visible to the user while the video recording is being produced, for enabling the user to view the video recording as it is being produced; and vending means for *automatically* presenting to the user a completed video recording on said vendable video recording medium, after completion of production of the recording.

13. A self-service video system for enabling one or more users to produce a video recording with the user's image in combination with a selected prerecorded background sequence, and for vending the resulting video recording, comprising:

enclosure means for receiving at least one user in position to be video recorded, *in the form of a booth capable of affording privacy and some degree of sound isolation;*

[a] video camera *means* in association with and oriented toward the enclosure means for use in making a video recording of the user *without intervention of any person other than the user;* background storage means for storing the selected prerecorded background sequence;

compositing means for positioning said selected prerecorded background sequence to appear in a composite picture with the user's image in the video recording to be produced;

video recording means, including means for recording the composite image on a vendable video recording medium for a preselected interval;

character generator means for generating readable text to be superimposed on the video recording being produced, in accordance with the selection of the user, and including user interaction means enabling user selection of said characters; and vending means for *automatically* presenting to the user a completed video recording on said vendable video recording medium, after completion of production of the recording.

16. A self-service video system for enabling one or more users to produce a video recording with the user's image in combination with a selected prerecorded background sequence, and for vending the resulting video recording, comprising:

enclosure means for receiving at least one user in position to be video recorded, *in the form of a booth capable of affording privacy and some degree of sound isolation;*

[a] video camera *means* in association with and oriented toward the enclosure means for use in making a video recording of the user *without intervention of any person other than the user;* background storage means for storing the selected prerecorded background sequence;

compositing means for positioning said selected prerecorded background sequence to appear in a composite picture with the user's image in the video recording to be produced;

said background storage means comprising a videodisc and videodisc player in association with the compositing means;

video recording means, including means for recording the composite image on a vendable video recording medium for a preselected interval; and vending means for *automatically* presenting to the user a completed video recording on said vendable video recording medium, after completion of production of the recording.

23. The *self-service* video system of claim [22] *19,* wherein the system enabling means includes a credit card reader.

31. A *self-service* video system for enabling a user to produce a video recording of his or her own image and for *automatically* vending the resulting video recording to the user, comprising:

a recording area *comprising a booth having enclosure means for affording privacy and some degree of sound isolation* for accommodating at least one user;

[a] video camera *means* oriented toward the recording area and connected video recording means for recording the user's image on a vendable videocassette for a preselected interval *without intervention of any person other than the user;* background storage means for storing a plurality of prerecorded background sequence, compositing means for causing a selected prerecorded background sequence to appear in a composite picture with the user's image in the video recording to be produced, and background select means for enabling the user to select a desired prerecorded background sequence for the video recording to be produced;

cassette storage and transport means for storing a plurality of videocassettes and for transporting a videocassette to a position for recording by the video recording means; and vending means adjacent to the recording area for presenting to the user a completed video recording on the videocassette, after completion of production of the recording.

34. A method for producing a *self-service* video recording of a subject composited with a selected prerecorded background sequence and vending the resulting video recording, comprising:

providing a recording area *comprising a booth having enclosure means for affording privacy and some degree of sound isolation;* storing a plurality of selectable prerecorded background sequences in a storage means, and providing the subject with a means for selection of a desired background sequence;

after selecting a background sequence, activating a recording system including a video camera aimed at the subject recording area, and making a recording of the subject's moving image on a vendable video recording medium while adding the preselected background sequence on the medium to produce a composite video recording with the subject and the background, *all without intervention of any person other than the user;* and

*automatically* vending the completed video recording to the user.

37. A method for producing a *self-service* video recording of a subject composited with a selected prerecorded background sequence and vending the resulting video recording, comprising:
 providing a recording area *in the form of a booth capable of affording privacy and some degree of sound isolation;*
 storing at least one prerecorded background sequence in a storage means;
 activating a recording system including a video camera aimed at the subject in the recording area, and making a recording of the subject's moving image on a vendable video recording medium while adding the preselected background sequence on the medium to produce a composite video recording with the subject and the background, *all without intervention of any person other than the user;*
 the preselected background sequence being added by keying, and wherein a preselected color is provided behind the subject in view of the video camera, so that the background sequence is recorded in all areas of camera view where the color appears to the camera; and
 *automatically* vending the completed video recording to the user.

41. A method for producing a video recording of a subject composited with a selected prerecorded background sequence and vending the resulting video recording, comprising:
 providing a recording area;
 storing at least one prerecorded background sequence in a storage means;
 activating a recording system including a video camera aimed at the subject in the recording area, and making a recording of the subject's moving image on a vendable video recording medium while adding the preselected background sequence on the medium to produce a composite video recording with the subject and the background, *all without intervention of any person other than the user;*
 the video camera including a servo-adjustable zoom lens, and the method including controlling the zoom lens in accordance with the timing of events and images in the background sequence, so that the focal length of the lens and the consequent size of the subject's image is correlated as desired with said events and images; and
 *automatically* vending the completed video recording to the user.

56. Apparatus for producing a *self-service* composite video recording of a person in combination with a selected prerecorded video sequence, *and for vending the recording to the user,* comprising:
 enclosure means *in the form of a booth for affording privacy and sound isolation.*
 means *in the booth* for displaying a composite video image of the prerecorded video sequence in combination with the person's real time image within view of the person; and means for recording said composite video image on a vendable video recording medium;
 means *in the booth* for displaying prompt messages for the person being recorded, which messages are not recorded on said recording medium, said prompt messages being displayed simultaneously with the selected prerecorded image; and
 means for *automatically* vending a composite video recording [of] on said vendable video recording medium to the user.

57. A system for producing a *self-service* composite video recording of a person in combination with a selected prerecorded video sequence, *and for vending the recording to the user,* comprising:
 enclosure means *in the form of a booth for affording privacy and sound isolation,*
 a videodisc player and associated videodisc having a plurality of selectable prerecorded background sequences and having encoded control data;
 means for user selection of a background sequence;
 video camera means *in the booth* for providing an image of the user; compositing means for combining the selected background sequence with the user's image from the video camera means at selected times and for selected intervals, to form a composite image;
 video recording means for making a recording including the composite image, onto a video recording medium;
 means for providing for variation in production parameters in the production of said composite video recording; [and]
 control means for receiving said encoded control data and for controlling said variable production parameters in accordance with the timing of events occurring in the selected background sequence *and means for automatically vending a composite video recording on said video recording medium to the user.*

* * * * *